United States Patent
Shimoshikiryoh

(10) Patent No.: US 10,657,909 B2
(45) Date of Patent: May 19, 2020

(54) LIQUID CRYSTAL DISPLAY PANEL AND METHOD FOR DRIVING SAME

(71) Applicant: SHARP KABUSHIKI KAISHA, Sakai, Osaka (JP)

(72) Inventor: Fumikazu Shimoshikiryoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 83 days.

(21) Appl. No.: 15/769,993

(22) PCT Filed: Oct. 20, 2016

(86) PCT No.: PCT/JP2016/081161
§ 371 (c)(1),
(2) Date: Apr. 20, 2018

(87) PCT Pub. No.: WO2017/069213
PCT Pub. Date: Apr. 27, 2017

(65) Prior Publication Data
US 2018/0315383 A1    Nov. 1, 2018

(30) Foreign Application Priority Data

Oct. 22, 2015   (JP) ................................ 2015-208117

(51) Int. Cl.
*G09G 3/32* (2016.01)
*G09G 3/36* (2006.01)
*G02F 1/1362* (2006.01)

(52) U.S. Cl.
CPC ......... *G09G 3/3607* (2013.01); *G09G 3/3614* (2013.01); *G02F 1/136213* (2013.01);
(Continued)

(58) Field of Classification Search
None
See application file for complete search history.

(56) References Cited

U.S. PATENT DOCUMENTS

| 2005/0122441 | A1  | 6/2005 | Shimoshikiryoh et al. |
| 2010/0253668 | A1* | 10/2010 | Sugihara ............. G09G 3/3607 345/211 |

(Continued)

FOREIGN PATENT DOCUMENTS

| JP | S63-091692 A | 4/1988 |
| JP | H05-257435 A | 10/1993 |

(Continued)

*Primary Examiner* — Joseph R Haley
(74) *Attorney, Agent, or Firm* — ScienBiziP, P.C.

(57) ABSTRACT

A liquid crystal display panel (100) includes a plurality of pixels, each of the pixels including a first subpixel and a second subpixel arranged so as to adjoin each other in a column direction. In any given frame period, the plurality of pixels include a plurality of pixel row pairs each associated with two selected pixel rows. In each pixel column, one pixel of each of the plurality of pixel row pairs is connected with a first source bus line (14a) associated with the pixel column, and the other pixel is connected with a second source bus line (14b) associated with the pixel column, and the plurality of pixel row pairs are each simultaneously selected. A plurality of frame periods include a first type frame period and a second type frame period differing in terms of combinations of two pixel rows to be associated with each of the plurality of pixel row pairs.

12 Claims, 12 Drawing Sheets

(52) U.S. Cl.
 CPC ......... *G09G 2300/0426* (2013.01); *G09G 2300/0852* (2013.01); *G09G 2310/021* (2013.01); *G09G 2320/0233* (2013.01); *G09G 2320/0242* (2013.01)

(56) References Cited

U.S. PATENT DOCUMENTS

| | | | |
|---|---|---|---|
| 2010/0289975 A1* | 11/2010 | Nakagawa | G02F 1/133707 349/33 |
| 2010/0295844 A1* | 11/2010 | Hayashi | G09G 3/2096 345/214 |
| 2012/0138922 A1 | 6/2012 | Yamazaki et al. | |
| 2013/0320334 A1 | 12/2013 | Yamazaki et al. | |
| 2014/0286076 A1 | 9/2014 | Aoki et al. | |
| 2015/0042693 A1 | 2/2015 | Hirata | |

FOREIGN PATENT DOCUMENTS

| | | |
|---|---|---|
| JP | 2005-189804 A | 7/2005 |
| JP | 2012-134475 A | 7/2012 |
| JP | 2014-007399 A | 1/2014 |
| JP | 2014-209727 A | 11/2014 |
| WO | 2009/084331 A1 | 7/2009 |
| WO | 2013/042613 A1 | 3/2013 |
| WO | 2017/069193 A1 | 4/2017 |

\* cited by examiner

LIQUID CRYSTAL DISPLAY PANEL AND METHOD FOR DRIVING SAME

TECHNICAL FIELD

The present invention relates to a liquid crystal display panel and a driving method thereof, and particularly to a large-size liquid crystal display panel for high-definition television applications and a driving method thereof. Herein, unless specified otherwise, the liquid crystal display panel refers to a TFT-type liquid crystal display panel.

BACKGROUND ART

The present applicant manufactures and sells large-size, high-definition liquid crystal display panels. For example, in large-size high-definition liquid crystal display panels exceeding FHD, such as 4K and 8K, it is sometimes difficult to obtain a sufficient time for charging for each pixel (write time). If a liquid crystal display panel which has m pixel rows is driven by such a driving method that scan lines (gate bus lines) each connected with the respective pixel rows are sequentially selected in a one by one manner, the charge time for each pixel will be less than 1/m of the frame period. To improve the display quality of, for example, moving images and stereoscopic images, the frame period has a tendency to be shortened.

A liquid crystal display device of Patent Document 1 includes two signal lines (source bus lines) corresponding to each pixel column (i.e., has a double source configuration). A driving method applied to the liquid crystal display device of Patent Document 1 sequentially selects the scan lines in a two by two manner such that two adjoining scan lines are simultaneously selected. In each pixel column, pixels connected with two simultaneously-selected scan lines are supplied with signal voltages from different signal lines and therefore can be simultaneously scanned. So long as the frame period is constant, by using a driving method that selects the scan lines in a two by two manner, the charge time for each pixel can be twice that obtained by a driving method that selects the scan lines in a one by one manner. The entire disclosure of Patent Document 1 is incorporated by reference in this specification.

CITATION LIST

Patent Literature

Patent Document No. 1: WO 2009/084331

SUMMARY OF INVENTION

Technical Problem

However, according to the present inventor, display unevenness sometimes disadvantageously occurred in the liquid crystal display device of Patent Document 1. The present inventor conducted research and found that this display unevenness is attributed to a driving method that selects the scan lines in a two by two manner. Details will be described later.

The present invention has been made for the purpose of solving the above-described problems. An object of the present invention is to provide a liquid crystal display panel in which occurrence of display unevenness due to a driving method that selects the gate bus lines in a two by two manner is suppressed, and a driving method thereof.

Solution to Problem

A liquid crystal display panel according to an embodiment of the present invention includes: a plurality of pixels arranged in a matrix including a plurality of rows and a plurality of columns, each of the plurality of pixels including a first subpixel and a second subpixel arranged so as to adjoin each other in a column direction; a plurality of TFTs each connected with any of the first subpixels and the second subpixels included in the plurality of pixels; a plurality of gate bus lines each associated with any of a plurality of pixel rows included in the plurality of pixels; a plurality of first source bus lines and a plurality of second source bus lines each associated with any of a plurality of pixel columns included in the plurality of pixels; and a plurality of storage capacitor bus lines each connected with any of storage capacitors of the first subpixels and the second subpixels included in the plurality of pixels, wherein the plurality of pixels are arranged such that the first subpixel of one pixel and the second subpixel of a pixel which adjoins the one pixel in the column direction adjoin each other, the plurality of storage capacitor bus lines include a storage capacitor bus line connected with a storage capacitor of the first subpixel of the one pixel and with a storage capacitor of the second subpixel of the pixel which adjoins the one pixel in the column direction, in any given frame period, the plurality of pixels include a plurality of pixel row pairs each associated with two selected pixel rows among the plurality of pixel rows, in each pixel column, one pixel of each of the plurality of pixel row pairs is connected with the first source bus line associated with the pixel column, and the other pixel is connected with the second source bus line associated with the pixel column, the plurality of pixel row pairs are each simultaneously selected, and a plurality of frame periods include a first type frame period and a second type frame period differing in terms of combinations of two pixel rows to be associated with each of the plurality of pixel row pairs.

In one embodiment, the first type frame period and the second type frame period are switched at a predetermined interval not less than one frame period.

In one embodiment, in each frame period, a polarity of a display signal voltage supplied to each of the plurality of first source bus lines does not vary, and a polarity of a display signal voltage supplied to each of the plurality of second source bus lines does not vary.

In one embodiment, a polarity of a display signal voltage supplied to each of the plurality of first source bus lines and a polarity of a display signal voltage supplied to each of the plurality of second source bus lines are inverted at a predetermined interval not less than one frame period.

In one embodiment, where the plurality of pixel rows include 1st to $rp^{th}$ pixel rows, each of the plurality of pixel row pairs in the first type frame period is associated with a $(2 \times m-1)^{th}$ row and a $(2 \times m)^{th}$ row (m is an integer not less than 1), and each of the plurality of pixel row pairs in the second type frame period is associated with a $(2 \times n-2)^{th}$ row and a $(2 \times n-1)^{th}$ row (n is an integer not less than 1).

In one embodiment, the liquid crystal display panel further includes: a gate driving circuit for supplying a gate signal voltage to the plurality of gate bus lines; a source driving circuit for supplying a display signal voltage to the plurality of first source bus lines and the plurality of second source bus lines; and a frame period type switching circuit for switching the combination of two pixel rows associated with each of the plurality of pixel row pairs.

In one embodiment, a period with which the first type frame period and the second type frame period are switched and a period with which a polarity of a display signal voltage supplied to each of the plurality of first source bus lines and to each of the plurality of second source bus lines is inverted are different from each other.

In one embodiment, a period with which the first type frame period and the second type frame period are switched and a period with which a polarity of a display signal voltage supplied to each of the plurality of first source bus lines and to each of the plurality of second source bus lines is inverted are equal to each other, and a timing at which the first type frame period and the second type frame period are switched and a timing at which a polarity of a display signal voltage supplied to each of the plurality of first source bus lines and to each of the plurality of second source bus lines is inverted are different from each other.

In one embodiment, a period with which the first type frame period and the second type frame period are switched and a period with which a polarity of a display signal voltage supplied to each of the plurality of first source bus lines and to each of the plurality of second source bus lines is inverted are equal to each other, and the first type frame period and the second type frame period are switched in response to a predetermined operation by a user.

In one embodiment, a period with which the first type frame period and the second type frame period are switched and a period with which a polarity of a display signal voltage supplied to each of the plurality of first source bus lines and to each of the plurality of second source bus lines is inverted are equal to each other, and the polarity of the display signal voltage supplied to each of the plurality of first source bus lines and to each of the plurality of second source bus lines is inverted in response to a predetermined operation by a user.

In one embodiment, each of the first subpixel and the second subpixel includes a liquid crystal capacitor formed by a counter electrode, a liquid crystal layer, and a subpixel electrode which opposes the counter electrode via the liquid crystal layer, and a storage capacitor formed by a storage capacitor electrode electrically connected to the subpixel electrode, an insulating layer, and a storage capacitor counter electrode which opposes the storage capacitor electrode via the insulating layer, the counter electrode is a single electrode which is common for the first subpixel and the second subpixel, while the storage capacitor counter electrodes of the first subpixel and the second subpixel are electrically independent of each other, the TFT connected with each of the first subpixel and the second subpixel of each pixel is controlled to be ON/OFF in accordance with a scan signal voltage supplied to a common gate bus line; when the TFT is ON, a display signal voltage is supplied from a common source bus line to the subpixel electrode and the storage capacitor electrode included in each of the first subpixel and the second subpixel; after the TFT has been turned OFF, the voltage of the storage capacitor counter electrode of each of the first subpixel and the second subpixel varies; and the first and second subpixels have mutually different variations, which are defined by their directions and amplitudes, thus exhibiting different luminances at least one grayscale level.

A liquid crystal display panel driving method according to an embodiment of the present invention is a method for driving a liquid crystal display panel, the liquid crystal display panel including a plurality of pixels arranged in a matrix including a plurality of rows and a plurality of columns, each of the plurality of pixels including a first subpixel and a second subpixel arranged so as to adjoin each other in a column direction, in any given frame period, the plurality of pixels including a plurality of pixel row pairs each associated with two selected pixel rows among the plurality of pixel rows, in each pixel column, one pixel of each of the plurality of pixel row pairs being connected with a first source bus line associated with the pixel column, and the other pixel being connected with a second source bus line associated with the pixel column, the plurality of pixel row pairs being each simultaneously selected, the method comprising switching a first type frame period and a second type frame period differing in terms of combinations of two pixel rows to be associated with each of the plurality of pixel row pairs.

In one embodiment, the liquid crystal display panel driving method includes switching the first type frame period and the second type frame period at a predetermined interval not less than one frame period.

In one embodiment, the liquid crystal display panel driving method further includes inverting a polarity of a display signal voltage supplied to each of the first source bus line and the second source bus line, wherein a period with which the first type frame period and the second type frame period are switched and a period with which a polarity of a display signal voltage supplied to each of the first source bus line and the second source bus line is inverted are different from each other.

In one embodiment, the liquid crystal display panel driving method further includes inverting a polarity of a display signal voltage supplied to each of the first source bus line and the second source bus line, wherein a period with which the first type frame period and the second type frame period are switched and a period with which a polarity of a display signal voltage supplied to each of the first source bus line and the second source bus line is inverted are equal to each other, and a timing at which the first type frame period and the second type frame period are switched and a timing at which a polarity of a display signal voltage supplied to each of the first source bus line and the second source bus line is inverted are different from each other.

Advantageous Effects of Invention

According to an embodiment of the present invention, a liquid crystal display panel in which occurrence of display unevenness due to a driving method that selects the gate bus lines in a two by two manner is suppressed and a driving method thereof are provided.

BRIEF DESCRIPTION OF DRAWINGS

FIG. 3 schematically illustrates a display state in a frame period (first type frame period) in which multi-pixel driving is not carried out.

FIG. 4 schematically illustrates a display state in a frame period (second type frame period) in which multi-pixel driving is not carried out.

FIG. 5 schematically illustrates the average of the display states of respective frame periods in which multi-pixel driving is not carried out.

FIG. 7 schematically illustrates a display state in a frame period (first type frame period) in which multi-pixel driving is carried out.

FIG. 8 schematically illustrates a display state in a frame period (second type frame period) in which multi-pixel driving is carried out.

FIG. 9 schematically illustrates the average of the display states of respective frame periods in which multi-pixel driving is carried out.

FIGS. 10(a) to 10(d) are diagrams illustrating the frame period type (first type or second type) and the change in polarity of display signal voltages in the liquid crystal display panel 100.

DESCRIPTION OF EMBODIMENTS

Figure 1:
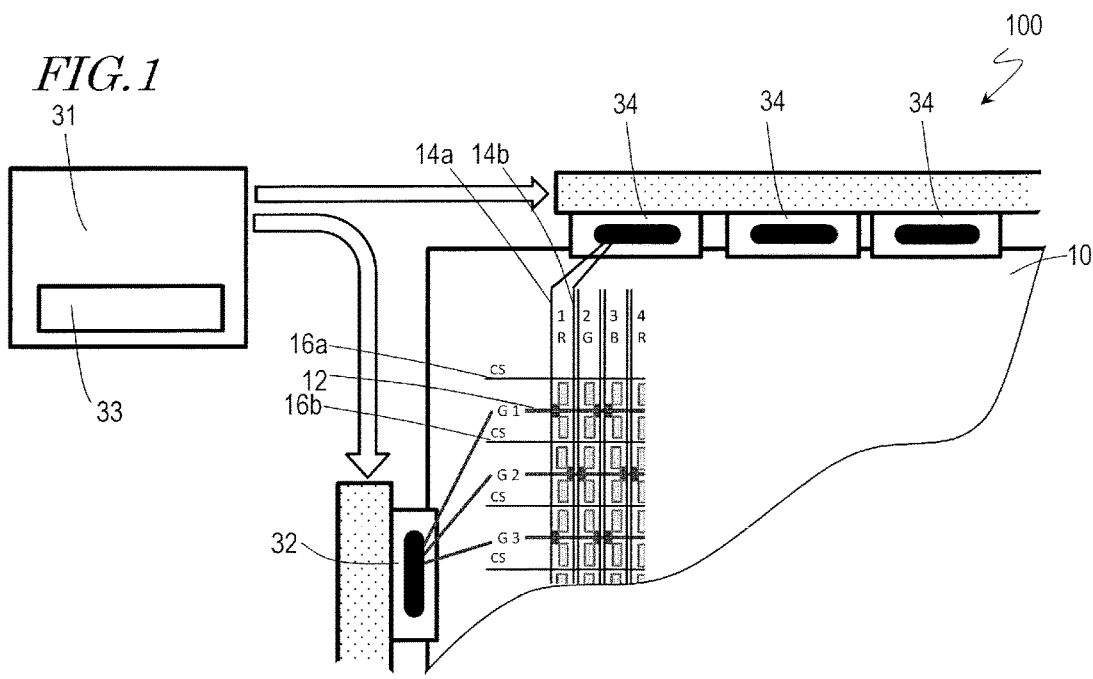
FIG. 1 is a diagram schematically showing a liquid crystal display panel 100 of an embodiment of the present invention.

Hereinafter, a liquid crystal display panel of an embodiment of the present invention is described with reference to the drawings. The present invention is not limited to the embodiment illustrated below. In the drawings mentioned below, components which have substantially the same functions are designated with common reference numerals, and the descriptions thereof are sometimes omitted.

A liquid crystal display panel 100 of an embodiment of the present invention is described. For the sake of easy understanding, a liquid crystal display panel 100 in which multi-pixel driving is not carried out is first described with reference to FIG. 1 to FIG. 6, although the same effects can also be achieved in a liquid crystal display panel 100 in which multi-pixel driving is carried out as will be described later.

Figure 2:
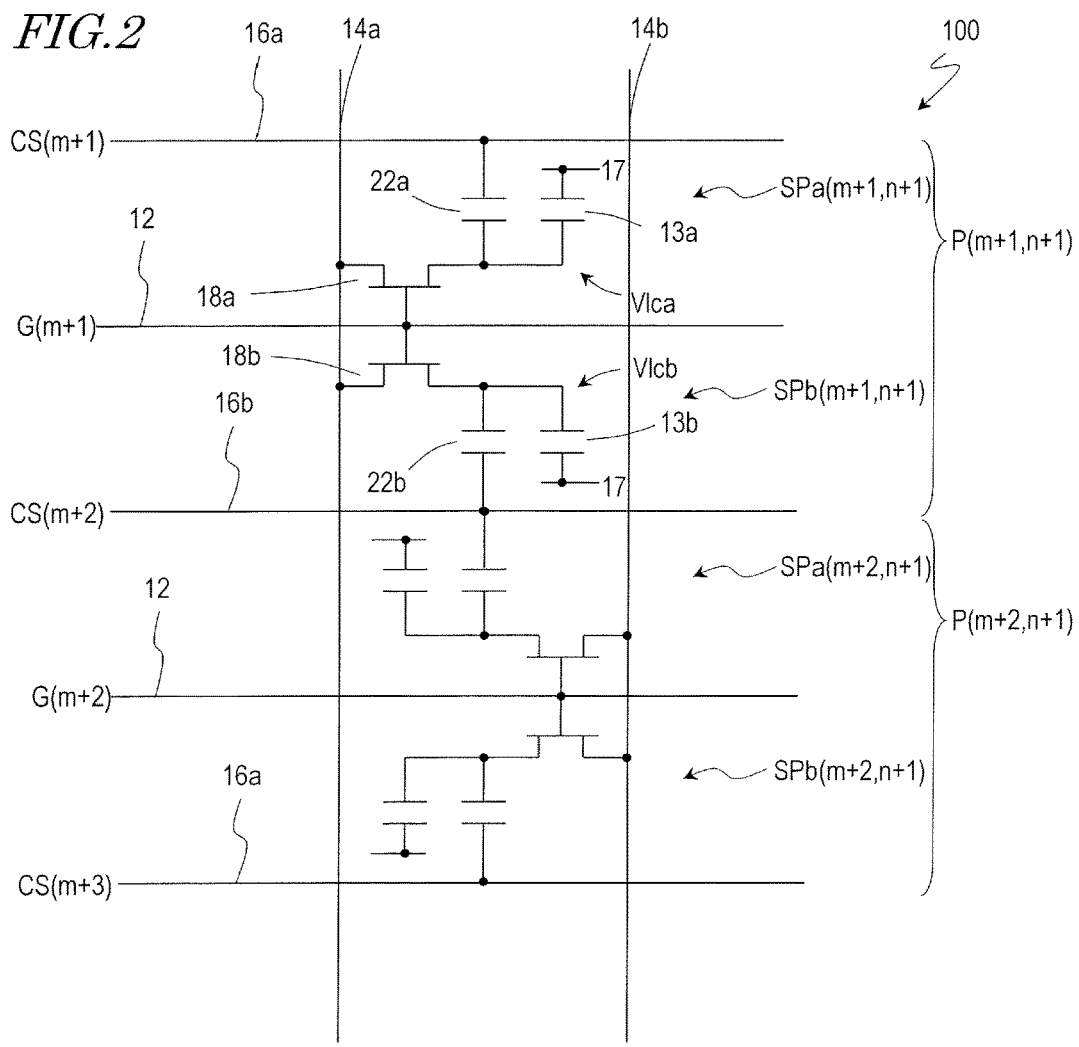
FIG. 2 is a diagram schematically showing an equivalent circuit of two pixels adjoining in the column direction in the liquid crystal display panel 100.
Figure 3:
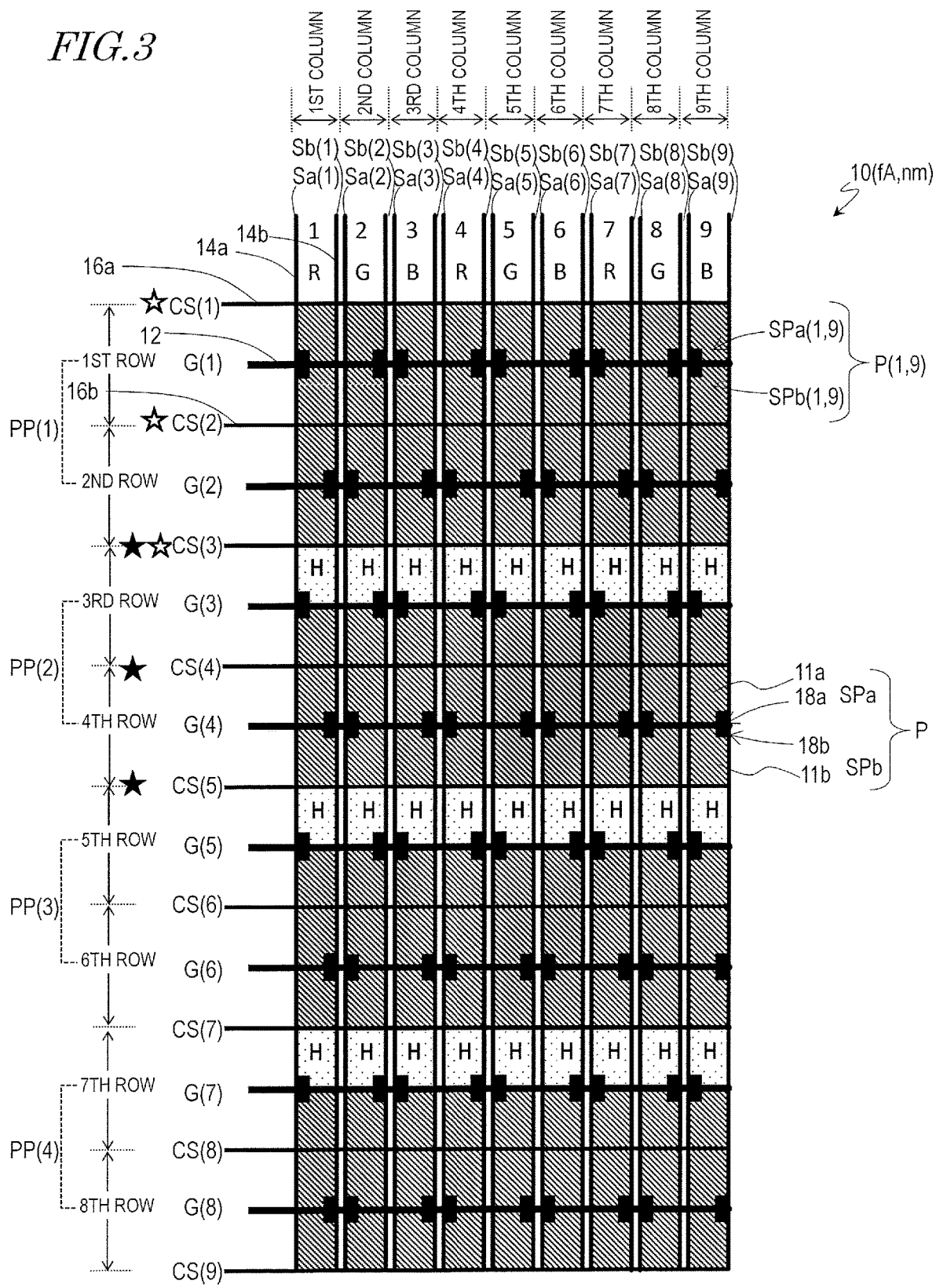
FIG. 3 is a diagram schematically showing a TFT substrate 10 used in the liquid crystal display panel 100.

Firstly, see FIG. 1 to FIG. 3. FIG. 1 is a diagram schematically showing a liquid crystal display panel 100 of an embodiment of the present invention. FIG. 2 is a diagram schematically showing an equivalent circuit of two pixels adjoining in the column direction in the liquid crystal display panel 100. FIG. 3 is a diagram schematically showing a TFT substrate 10 used in the liquid crystal display panel 100. FIG. 3 schematically illustrates a display state in a frame period (first type frame period) in which multi-pixel driving is not carried out. The suffix "fA" in parentheses to the reference numeral of a TFT substrate means that the TFT substrate is in a state of the first type frame period. The suffix "nm" in parentheses to the reference numeral of a TFT substrate means that multi-pixel driving is not carried out in the TFT substrate.

The liquid crystal display panel 100 includes a TFT substrate 10, a counter substrate (not shown), and a liquid crystal layer (not shown) interposed between the substrates. The liquid crystal display panel 100 has a multi-pixel structure. Specifically, a plurality of pixels included in the liquid crystal display panel 100 are arranged in a matrix (rp, cq) including a plurality of rows (1 to rp) and a plurality of columns (1 to cq). Each pixel P (p, q) (where $1 \leq p \leq rp$, $1 \leq q \leq cq$) includes two subpixels, i.e., the first subpixel SPa (p, q) and the second subpixel SPb (p, q). In each pixel, the first subpixel SPa and the second subpixel SPb are arranged so as to adjoin each other in the column direction.

As shown in FIG. 2 and FIG. 3, a plurality of pixels are arranged such that the first subpixel SPa (p, q) of one pixel P (p, q) and the second subpixel SPb (p−1, q) of a pixel P (p−1, q) which adjoins the one pixel P (p, q) in the column direction adjoin each other. The present invention is not limited to the illustrated example. The plurality of pixels may be arranged such that the second subpixel SPb (p, q) of one pixel P (p, q) and the first subpixel SPa (p−1, q) of a pixel P (p−1, q) which adjoins the one pixel P (p, q) in the column direction adjoin each other.

The two subpixels SPa and SPb are capable of exhibiting different luminances. In accordance with a source signal voltage (grayscale signal voltage) input to pixel P, one subpixel exhibits a higher luminance than the luminance which is to be displayed by pixel P and the other subpixel exhibits a lower luminance than the luminance which is to be displayed by pixel P, such that the entire pixel P exhibits the luminance corresponding to the input source signal voltage. The first subpixel SPa may exhibit a higher luminance and the second subpixel SPb may exhibit a lower luminance. Alternatively, the first subpixel SPa may exhibit a lower luminance and the second subpixel SPb may exhibit a higher luminance. The multi-pixel structure is particularly suitably used in a vertical alignment mode liquid crystal display panel and can improve the viewing angle dependence of the gamma characteristics of the panel. A configuration and a driving method of a liquid crystal display panel which has a multi-pixel structure are disclosed in, for example, Japanese Laid-Open Patent Publication No. 2005-189804 (Japanese Patent No. 4265788) of the present applicant. The entire disclosure of Japanese Laid-Open Patent Publication No. 2005-189804 is incorporated by reference in this specification.

The multi-pixel driving is not necessarily carried out on all the grayscale levels. The multi-pixel driving may be carried out only on grayscale levels which need the multi-pixel driving. For example, the multi-pixel driving may be carried out on low grayscale levels, such as grayscale levels equal to or lower than the 96th or 64th grayscale level in 256 grayscale levels of 0 to 255 grayscale levels. That is, at least one grayscale level, the first subpixel SPa and the second subpixel SPb of each pixel may exhibit equal luminances. When the multi-pixel driving is not carried out, the grayscale levels exhibited by the two subpixels SPa and SPb are equal to the grayscale level which is to be exhibited by the pixel. Since the viewing angle dependence of the γ characteristics of a normally-black mode liquid crystal display device is large at low grayscale levels, the viewing angle dependence of the γ characteristics can be improved even when such a driving method is used.

The TFT substrate 10 includes a plurality of TFTs 18a, 18b. Each of the plurality of TFTs 18a, 18b is connected with either of the first subpixel SPa or the second subpixel SPb included in the plurality of pixels. The TFT substrate 10 includes two subpixel electrodes (the first subpixel electrode 11a and the second subpixel electrode 11b) corresponding to the two subpixels (the first subpixel SPa and the second subpixel SPb).

As shown in FIG. 2, the first subpixel SPa is connected with a TFT 18a and a storage capacitor (CS) 22a, and the second subpixel SPb is connected with a TFT 18b and a storage capacitor (CS) 22b. The gate electrodes of the TFT 18a and the TFT 18b are connected with a common (the same) gate bus line (scan line) 12. The source electrodes of the TFT 18a and the TFT 18b are connected with a common (the same) source bus line (signal line) 14a or 14b. The storage capacitors 22a, 22b are connected with storage capacitor bus lines (also referred to as "storage capacitor wires" or "CS bus lines") 16a, 16b, respectively. The storage capacitors 22a and 22b are formed by storage capacitor electrodes electrically connected to the subpixel electrodes 11a and 11b, respectively, storage capacitor counter electrodes electrically connected to the storage capacitor bus lines 16a and 16b, and an insulating layer (not shown) interposed therebetween. The storage capacitor counter electrodes of the storage capacitors 22a and 22b are independent of each other and can be supplied with different storage capacitor counter voltages (CS signal voltages) from the storage capacitor bus lines 16a and 16b, respectively.

After a display signal voltage is supplied from the common source bus line 14a or 14b to the subpixel electrode 11a and the subpixel electrode 11b, and the TFT 18a and the TFT 18b are turned OFF, the variations (defined by their directions and the amplitudes) of the voltages of the storage capacitor counter electrodes of the storage capacitors 22a and 22b (i.e., the voltage supplied from the storage capacitor bus line 16a or the storage capacitor bus line 16b) are varied, resulting in a state where the effective voltages applied to the liquid crystal capacitors 13a, 13b of the subpixels SPa and SPb are different, i.e., the luminances of the subpixels SPa and SPb are different. When this configuration is used, a display signal voltage can be supplied from a single source bus line 14a or 14b to two subpixels SPa and SPb. Therefore, the luminances of the subpixels SPa and SPb can be varied from each other without increasing the number of source bus lines or the number of source drivers.

In an electric equivalent circuit, the liquid crystal capacitors of the first subpixel SPa and the second subpixel SPb are shown as liquid crystal capacitors 13a and 13b, respectively. The liquid crystal capacitors 13a, 13b are respectively formed by the subpixel electrodes 11a and 11b, the liquid crystal layer (not shown), and a counter electrode 17 (which is common among the subpixels SPa and SPb). When the liquid crystal capacitors 13a, 13b are mentioned as electrical components, these are also referred to as liquid crystal capacitors Clca, Clcb, respectively. When the storage capacitors 22a, 22b are mentioned as electrical components, these are also referred to as storage capacitors Ccsa, Ccsb, respectively.

In FIG. 2, one pixel P (m+1, n+1) is considered. One of the electrodes of the liquid crystal capacitor Clca and one of the electrodes of the storage capacitor Ccsa of the first subpixel SPa are connected with the drain electrode of the TFT 18a that is provided for driving the first subpixel SPa, while the other electrode of the liquid crystal capacitor Clca is connected with the counter electrode 17 and the other electrode of the storage capacitor Ccsa is connected with the storage capacitor bus line 16a. One of the electrodes of the liquid crystal capacitor Clcb and one of the electrodes of the storage capacitor Ccsb of the second subpixel SPb are connected with the drain electrode of the TFT 18b that is provided for driving the second subpixel SPb, while the other electrode of the liquid crystal capacitor Clcb is connected with the counter electrode 17 and the other electrode of the storage capacitor Ccsb is connected with the storage capacitor bus line 16b. Meanwhile, a pixel P (m+2, n+1) which adjoins the one pixel in the column direction is considered. The other electrode of the storage capacitor Ccsa of the first subpixel SPa is connected with the storage capacitor bus line 16b, and the other electrode of the storage capacitor Ccsb of the second subpixel SPb is connected with the storage capacitor bus line 16a. That is, the storage capacitor bus line CS (m+2) is connected with a storage capacitor 22a of the first subpixel SPa (m+2, n+1) of the pixel P (m+2, n+1) and with the storage capacitor 22b of the second subpixel SPb (m+1, n+1) of the pixel P (m+1, n+1) which adjoins the pixel P (m+2, n+1) in the column direction.

The source electrodes of the TFT 18a and the TFT 18b of the pixel P (m+1, n+1) are connected with the source bus line 14a. The source electrodes of the TFT 18a and the TFT 18b of the pixel P (m+2, n+1) which adjoins the pixel P (m+1, n+1) in the column direction are connected with the source bus line 14b. Note that, however, as will be described later, the electrical connection between the TFTs 18a, 18b of each pixel and the source bus lines 14a, 14b is not limited to the example illustrated in FIG. 2.

The gate bus line 12 and/or the source bus lines 14a, 14b may not be common, as long as the TFT 18a and the TFT 18b of each pixel are supplied with a common scan signal voltage (gate signal voltage) and a common display signal voltage (source signal voltage). Note that, however, since increase of the number of gate bus lines and/or the number of source bus lines will be the cause of decrease of the aperture ratio, it is preferred that two TFTs 18a, 18b corresponding to respective ones of two subpixels SPa and SPb that constitute one pixel P are connected with the common gate bus line 12 and the common source bus line 14a or 14b.

Now, refer to FIG. 3. The TFT substrate 10 includes a plurality of gate bus lines 12. Each of the plurality of gate bus lines 12 is associated with any of a plurality of pixel rows included in the plurality of pixels. A plurality of pixels aligned in the row direction are referred to as "pixel row".

The liquid crystal display panel 100 that includes the TFT substrate 10 has a double source configuration. Specifically, the TFT substrate 10 includes a plurality of first source bus lines 14a and a plurality of second source bus lines 14b. Each of the plurality of first source bus lines 14a is associated with any of a plurality of pixel columns included in the plurality of pixels. Each of the plurality of second source bus lines 14b is associated with any of the plurality of pixel columns included in the plurality of pixels. A plurality of pixels aligned in the column direction are referred to as "pixel column". Typically, each pixel column is associated with a single first source bus line 14a and a single second source bus line 14b. In the drawing, a source bus line provided on the left side of the pixels is shown as the first source bus line 14a, and a source bus line provided on the right side of the pixels is shown as the second source bus line 14b.

The TFT substrate 10 includes a plurality of storage capacitor bus lines 16a, 16b. Each of the plurality of storage capacitor bus lines 16a, 16b is connected with any of the storage capacitors 22a, 22b of the first subpixel SPa and the second subpixel SPb included in the plurality of pixels. As previously described, the plurality of storage capacitor bus lines 16a, 16b include storage capacitor bus lines 16a, 16b which are connected with the storage capacitor of the first subpixel SPa(p, q) of one pixel P(p, q) and with the storage capacitor of the second subpixel SPb(p−1, q) of a pixel P (p−1, q) that adjoins the one pixel in the column direction.

The plurality of pixels include a plurality of pixel row pairs. Each of the plurality of pixel row pairs is associated with two predetermined pixel rows included in the plurality of pixel rows. In each pixel column, one pixel of each of the plurality of pixel row pairs is connected with a first source bus line 14a which is associated with the pixel column, and the other pixel is connected with a second source bus line 14b which is associated with the pixel column. Each of the plurality of pixel row pairs is simultaneously selected. Each of the plurality of pixel row pairs is selected in accordance with, for example, a common scan signal voltage. That is, each of the plurality of pixel row pairs is selected by a common scan signal voltage supplied to gate bus lines associated with two pixel rows that are associated with the each of the plurality of pixel row pairs.

An example of the pixel row pair is described. When a plurality of pixels include rp pixel rows, the plurality of pixels include, for example, rp/2 pixel row pairs. For example, the first pixel row pair is associated with the first and second pixel rows. This is represented as PP(1)=(1, 2). The second pixel row pair is associated with the third and fourth pixel rows. That is, PP(2)=(3, 4). In general, the $n^{th}$ pixel row pair is associated with the $(2\times n-1)^{th}$ and $(2\times n)^{th}$ pixel rows (where 1≤n≤rp/2). That is, PP(n)=(2×n−1, 2×n). (In this specification, "×" represents multiplication.) In an arbitrary frame period, the pixel row pairs are selected in the order of the first pair, the second pair, the third pair, and so on. That is, the $n^{th}$ pixel row pair is the $n^{th}$ selection in each frame period. In each frame period, the $n^{th}$ pixel row pair is selected in, for example, the $n^{th}$ horizontal scanning period.

In each pixel column, pixels connected with two simultaneously-selected gate bus lines are supplied with display signal voltages from different source bus lines 14a and 14b and therefore can be scanned simultaneously. Since the liquid crystal display panel 100 is driven by selecting the scan lines in a two by two manner, the charge time for each pixel can be twice that achieved in a liquid crystal display panel which is driven by a driving method that selects the scan lines in a one by one manner.

The liquid crystal display device of Patent Document 1 has the same pixel configuration as that of the liquid crystal display panel 100 of the present embodiment. The liquid crystal display device of Patent Document 1 is also the same with the liquid crystal display panel 100 in that it includes a plurality of pixel row pairs and that each of the plurality of pixel row pairs is simultaneously selected. Thus, the descriptions of the configuration and the driving method of the liquid crystal display panel 100 of the present embodiment also apply to the configuration and the driving method of the liquid crystal display device of Patent Document 1.

The liquid crystal display device of Patent Document 1 is different from the embodiment of the present invention in the following points. In the liquid crystal display device of Patent Document 1, the combination of pixel rows associated with each of the plurality of pixel row pairs in each frame period is the same. On the other hand, in the liquid crystal display panel 100 of the embodiment of the present invention, a plurality of frame periods include a first type frame period and a second type frame period between which the combination of two pixel rows associated with each of the plurality of pixel row pairs is different.

In this specification, the term "frame period" means a time period from a point when the writing of one frame is started to a point when the writing of the next frame is started. In other words, the "frame period" means a time period from a point when a pixel row (or pixel row pair) is selected first in one frame to a point when a pixel row (or pixel row pair) is selected first in the next frame. In the liquid crystal display panel of the embodiment of the present invention, the "frame period" includes "first type frame period" and "second type frame period". The "first type frame period" and the "second type frame period" are different from each other in the order (pattern) of scanning the gate bus lines in a frame period. The order (pattern) of scanning the gate bus lines in the first type frame period is also referred to as "scan mode A". The order (pattern) of scanning the gate bus lines in the second type frame period is also referred to as "scan mode B". The term "vertical scanning period" means a time period from a point when a gate bus line (scan line) is selected to a point when the same gate bus line is selected next time. The "vertical scanning period" is defined for each pixel row and can differ depending on the types of two consecutive frame periods. In each frame period, the difference (period) between a point in time when one gate bus line is selected and a point in time when the next gate bus line (except for a gate bus line which is selected simultaneously with the one gate bus line) is selected is referred to as one horizontal scanning period (1H).

Figure 12:
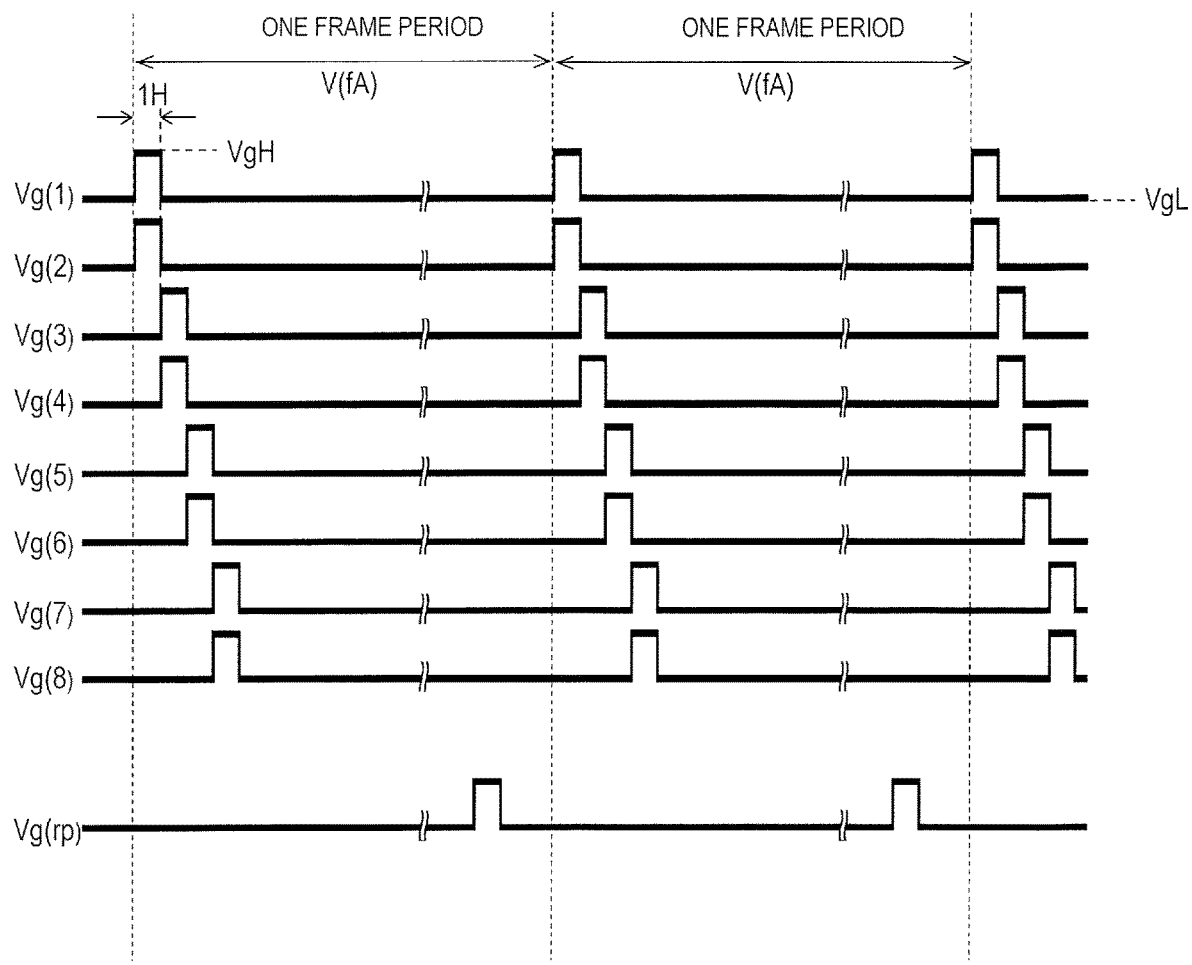
FIG. 12 is a chart for illustrating the waveforms of gate signal voltages Vg used for driving of the liquid crystal display device of Patent Document 1.

Now, the cause of display unevenness which can occur in the liquid crystal display device of Patent Document 1 is described with reference to FIG. 3 and FIG. 12. A liquid crystal display panel example described herein has the same configuration as that shown in FIG. 1 to FIG. 3 and is driven using the voltages shown in FIG. 12. FIG. 12 is a chart illustrating the waveforms of gate signal voltages Vg used for driving of the liquid crystal display device of Patent Document 1.

In each frame period, in the first horizontal scanning period, for example, the first pixel row pair is simultaneously selected, i.e., the first and second pixel rows are simultaneously selected. At this timing, a common scan signal voltage is supplied to the gate bus lines G(1) and G(2) associated with the first and second pixel rows, so that gate signal voltages Vg(1) and Vg(2) of the gate bus lines G(1) and G(2) transition from LOW (VgL) to HIGH (VgH). In a period where the gate signal voltages of the gate bus lines G(1) and G(2) are HIGH, the TFTs 18a, 18b connected with the gate bus lines G(1) and G(2) are ON, and each pixel is supplied with a source signal voltage from a corresponding source bus line 14a or 14b. When charging of the pixel is started, the potential of the pixel electrode 11a, 11b (drain voltage) changes, and accordingly, a ripple voltage is superposed on the CS signal voltage via a parasitic capacitance between the drain and the CS. The ripple voltage is superposed in the storage capacitor bus lines CS(1), CS(2) and CS(3) (open stars in FIG. 3).

Figure 13:
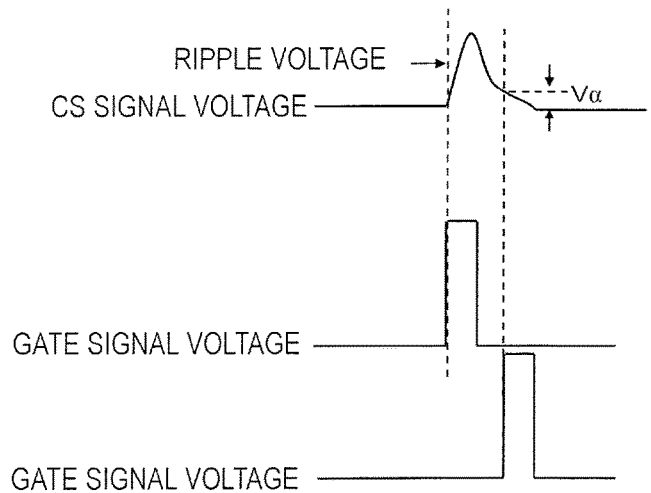
FIG. 13 is a chart showing the change with time of a ripple voltage on a CS signal voltage and a gate signal voltage in one pixel and a gate signal voltage of the next-selected gate bus line.

FIG. 13 shows the change with time of a ripple voltage on a CS signal voltage and a gate signal voltage in one pixel and a gate signal voltage of the next-selected gate bus line. Although in actuality the CS signal voltage changes with time in some cases, the chart shows a ripple voltage relative to the CS signal voltage. The polarity of the ripple voltage can sometimes invert depending on that of the display signal voltage.

As shown in FIG. 13, the ripple voltage superposed on the CS signal voltage attenuates with time. For example, when the amplitude of the display signal voltage is large, i.e., when the luminance displayed by the pixel is high, the absolute value of the ripple voltage is large. Therefore, when the gate signal voltage transitions from HIGH to LOW, the ripple voltage has not thoroughly attenuated and can have a finite value in some cases. If the ripple voltage has not thoroughly attenuated when the gate voltage transitions from HIGH to LOW, the ripple voltage still attenuates after the gate signal voltage transitions from HIGH to LOW. In this case, the drain voltage (pixel electrode potential) is affected by the CS signal voltage and thus deviates from an expected level due to the remaining ripple voltage. If the amplitude of the display signal voltage is large, in some cases, the ripple voltage has not thoroughly attenuated when the gate signal voltage of the next-selected gate bus line transitions from LOW to HIGH.

In the next horizontal scanning period (second horizontal scanning period), the second pixel row pair is simultaneously selected, i.e., the third and fourth pixel rows are simultaneously selected. At this timing, a ripple voltage is superposed on the storage capacitor bus lines CS(3), CS(4) and CS(5) (solid stars in FIG. 3). Of these bus lines, the ripple voltage Va superposed in the previous horizontal scanning period (first horizontal scanning period) is remaining in the storage capacitor bus line CS(3). Meanwhile, in the storage capacitor bus lines CS(4) and CS(5), the ripple voltage has thoroughly attenuated and is not remaining because about one vertical scanning period has passed since the previous superposition of the ripple voltage. Therefore, the absolute value of the superposed ripple voltage is larger in the storage capacitor bus line CS(3) than in the storage capacitor bus lines CS(4) and CS(5). Since the drain voltage (pixel electrode potential) is affected by the CS signal voltage, the luminance displayed in pixels connected with the storage capacitor bus line CS(3) is higher than the luminance displayed in pixels connected with the storage capacitor bus lines CS(4) and CS(5). As shown in FIG. 3, in the third and fourth pixel rows, the luminance of the first subpixel SPa of the third row is higher than the luminances of the other subpixels. Likewise, in the fifth and sixth pixel rows, the luminance of the first subpixel SPa of the fifth row is higher than the luminances of the other subpixels. In FIG. 3, subpixels labeled with "H" have a higher luminance than subpixels without "H" due to a ripple voltage.

Thus, in the liquid crystal display device of Patent Document 1, display unevenness which is attributed to occurrence of a subpixel row (a plurality of subpixels aligned in the row direction) of higher display luminance can occur in every two pixel rows in some cases. This display unevenness occurs in every two pixel rows and is therefore disadvantageously conspicuous. The problem that the above-described display unevenness sometimes occurs in the liquid crystal display device of Patent Document 1 was recognized when the present inventor actually manufactured a test copy of the liquid crystal display device of Patent Document 1.

Next, it is explained with reference to FIG. 3 to FIG. 6 that the liquid crystal display panel 100 of the embodiment of the present invention can solve the above-described problems.

Figure 4:
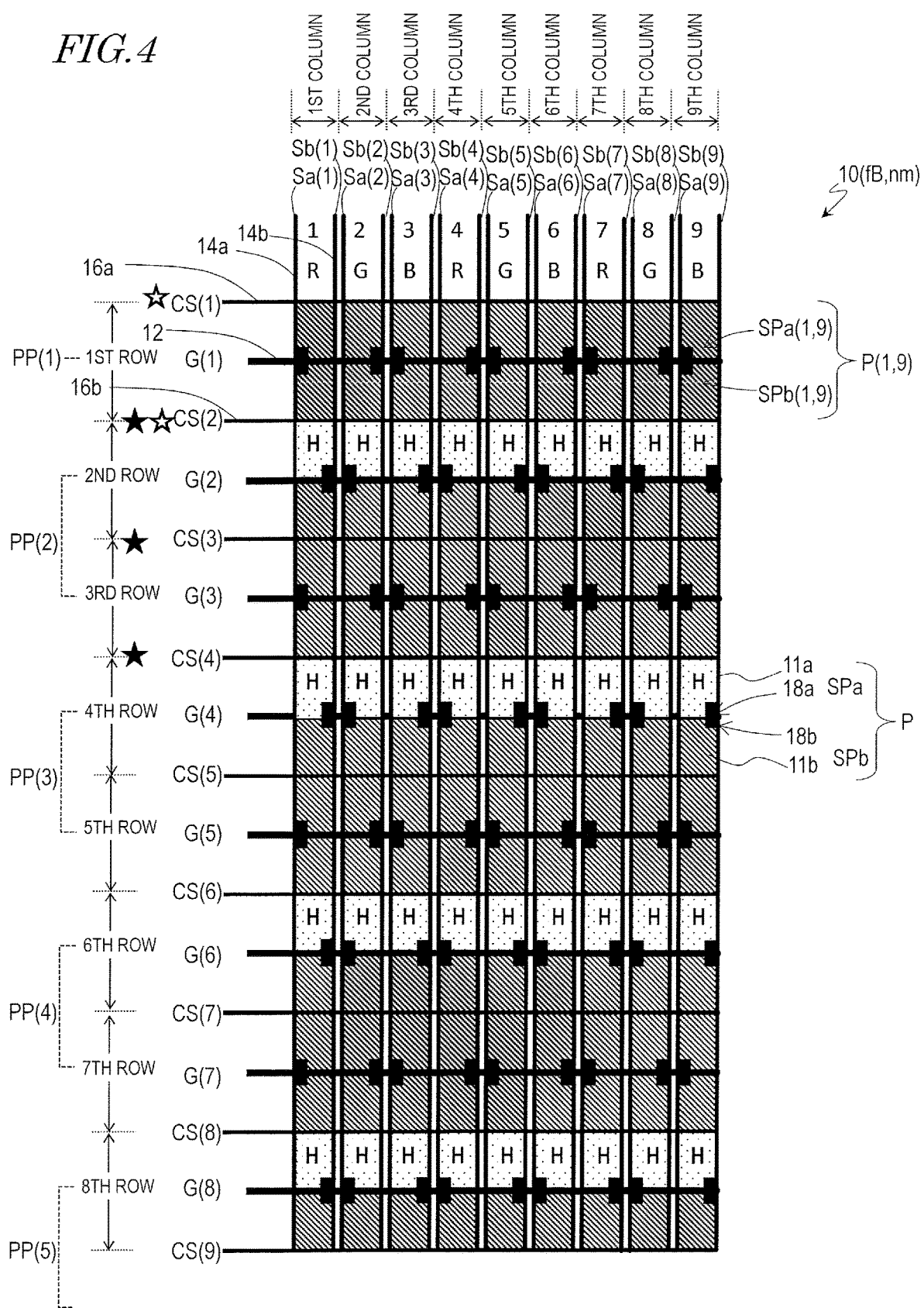
FIG. 4 is a diagram schematically showing the TFT substrate 10 used in the liquid crystal display panel 100.
Figure 5:
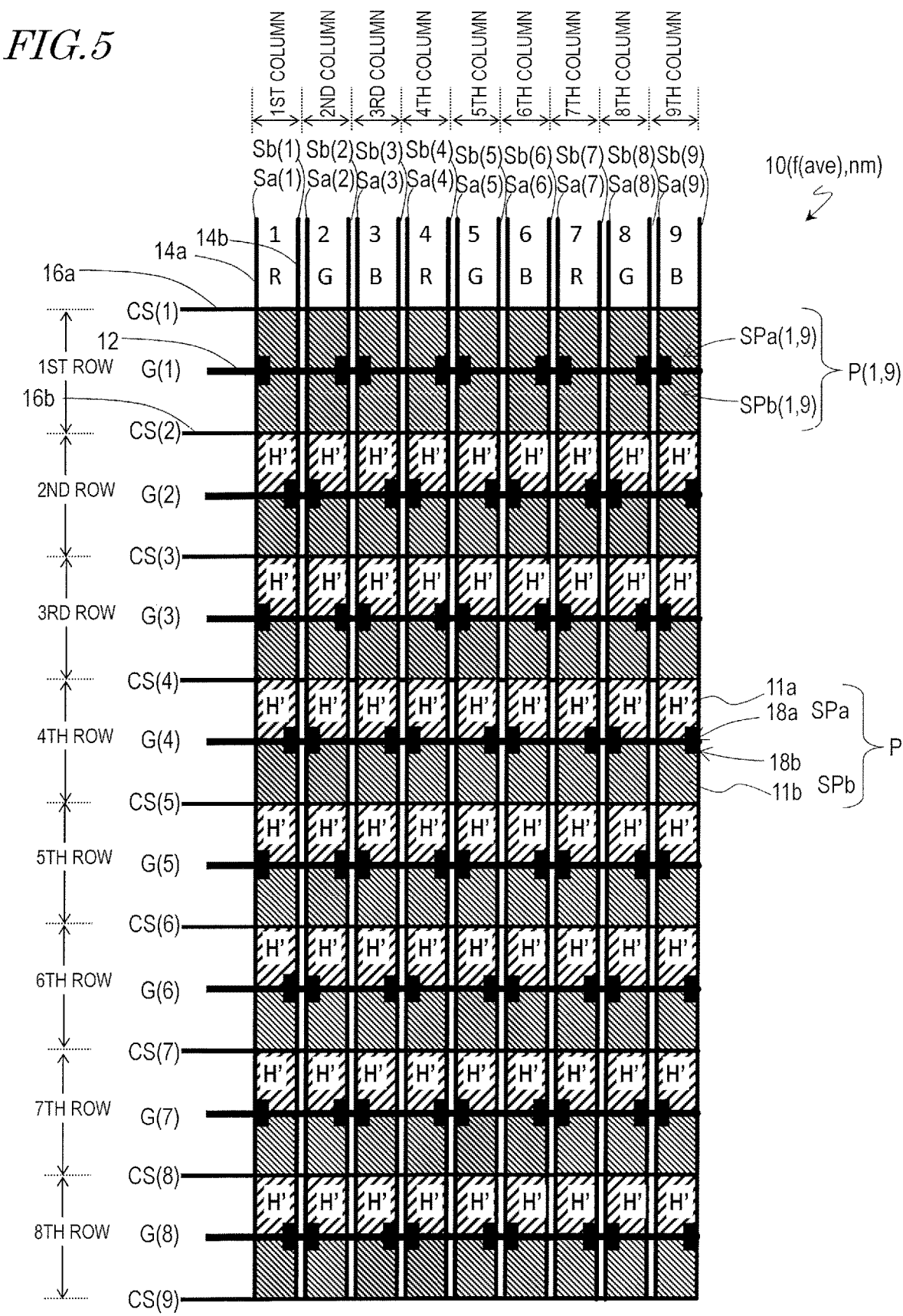
FIG. 5 is a diagram schematically showing the TFT substrate 10 used in the liquid crystal display panel 100.
Figure 6:
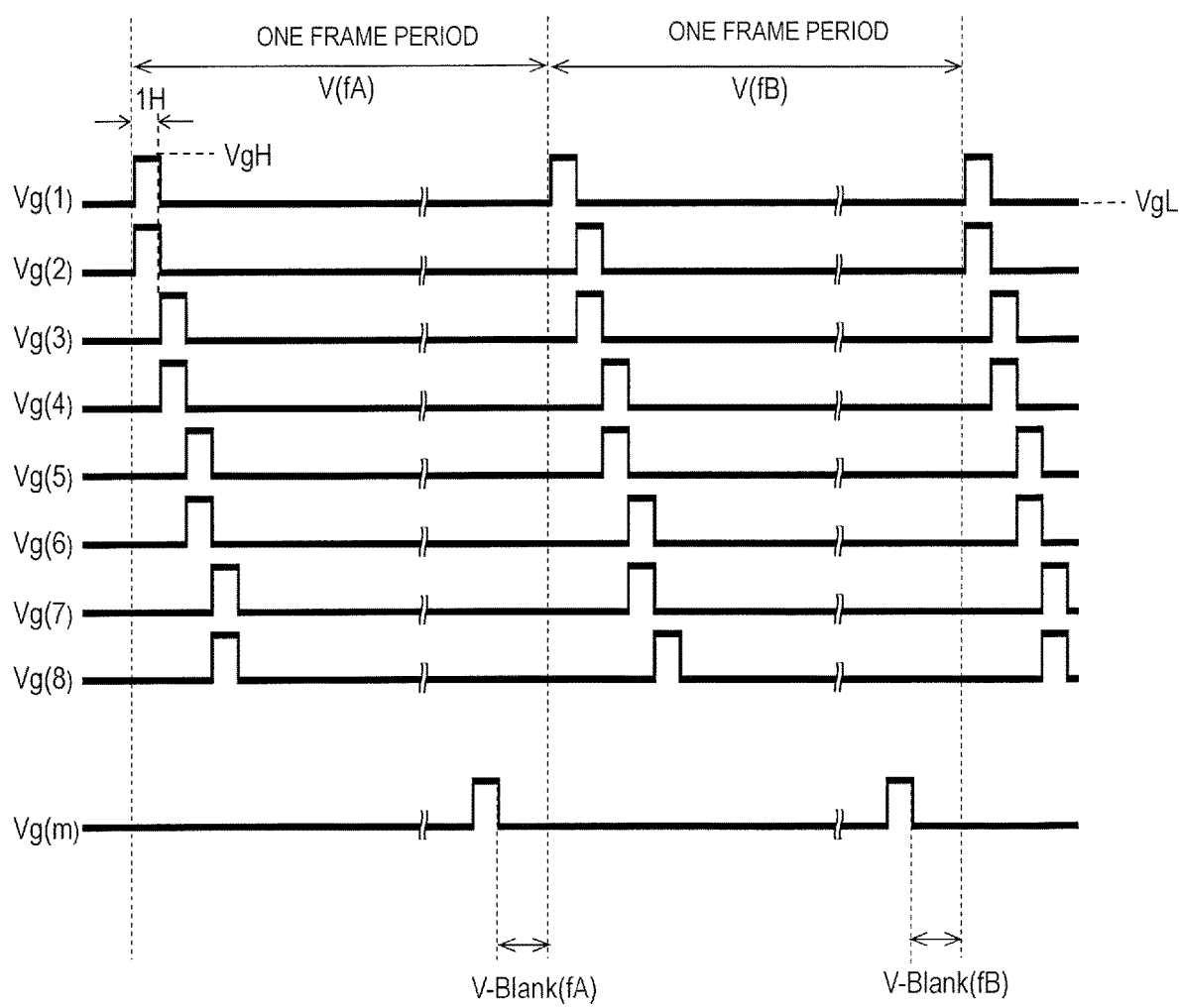
FIG. 6 is a chart for illustrating the waveforms of gate signal voltages Vg used for driving of the liquid crystal display panel 100.

FIG. 4 is a diagram schematically showing the TFT substrate 10 used in the liquid crystal display panel 100. FIG. 4 schematically illustrates a display state in a frame period (second type frame period). FIG. 5 is a diagram schematically showing the TFT substrate 10 used in the liquid crystal display panel 100. FIG. 5 schematically illustrates the average of the display states of respective frame periods. FIG. 4 and FIG. 5 each shows a frame period in which multi-pixel driving is not carried out. The suffix "fB" in parentheses to the reference numeral of a TFT substrate means that the TFT substrate is in a state of the second type frame period. The suffix "f(ave)" in parentheses to the reference numeral of a TFT substrate means that it shows the average of respective frame periods (including first type frame periods and second type frame periods). FIG. 6 is a chart for illustrating the waveforms of gate signal voltages Vg used for driving of the liquid crystal display panel 100.

In the liquid crystal display panel 100, a plurality of frame periods include a first type frame period and a second type frame period between which the combination of two pixel rows associated with each of the plurality of pixel row pairs is different.

For example, in the first type frame period, rp/2 pixel row pairs (PP(n)=(2×n−1, 2×n)) (where 1≤n≤rp/2) which have previously been described are included. The plurality of pixel row pairs in the second type frame period have a different combination of pixel rows from that in the first type frame period. In the second type frame period, for example, as shown in FIG. 4, the $n^{th}$ pixel row pair is associated with the $(2×n−2)^{th}$ and $(2×n−1)^{th}$ pixel rows. That is, PP(n)=(2× n−2, 2×n−1) (where 1≤n≤rp/2+1). Specifically, the first pixel row pair is associated with the first pixel row. That is, PP(1)=(1). The second pixel row pair is associated with the second and third pixel rows. That is, PP(2)=(2, 3). When the number of pixel rows is rp, the plurality of pixel row pairs in the second type frame period include, for example, (rp/2+1) pixel row pairs. Therefore, the first type frame period and the second type frame period are different from each other in the order (pattern) of scanning the gate bus lines in a frame period.

Herein, the first selection in the second type frame period is one pixel row (first pixel row), which is however referred to as "first pixel row pair" for the sake of convenience. With such an expression, it can be consistently explained that the $n^{th}$ pixel row pair is the $n^{th}$ selection in a frame period (i.e., selected in the $n^{th}$ horizontal scanning period). However, the present invention is not limited to this example. For example, the last selection in the first type frame period or the second type frame period can be one pixel row depending on whether the number of pixel rows is even or odd. However, such a case is treated in the same way.

As shown in FIG. 4, in the second type frame period, pixel rows which become bright due to a ripple voltage superposed on the CS signal voltage are different from those in the first type frame period. In the second type frame period, in the first horizontal scanning period, a ripple voltage is superposed in the storage capacitor bus lines CS(1) and CS(2) (open starts in FIG. 4), and in the second horizontal scanning period, a ripple voltage is superposed in the storage capacitor bus lines CS(2), CS(3) and CS(4) (solid starts in FIG. 4). A storage capacitor bus line in which a ripple voltage is superposed in both the first horizontal scanning period and the second horizontal scanning period is the storage capacitor bus line CS(2). In the second and third pixel rows, the luminance of the first subpixel SPa of the second row is higher than the luminances of the other subpixels. Likewise, in the fourth and fifth pixel rows, the luminance of the first subpixel SPa of the fourth row is higher than the luminances of the other subpixels. In FIG. 4, subpixels labeled with "H" have a higher luminance than subpixels without "H" due to a ripple voltage.

Since in the second type frame period bright pixel rows are different from those in the first type frame period, display unevenness which occurs in every two pixel rows is suppressed by averaging the display states of respective frame periods. FIG. 5 schematically illustrates the average of the display luminances of respective pixels in the first type frame period and the display luminances of respective pixels in the second type frame period. As shown in FIG. 5, when the display states of respective frame periods are averaged, pixels which are bright due to the ripple voltage occur in every pixel row, and the luminance thereof is reduced. Therefore, the display unevenness is inconspicuous as compared with the liquid crystal display device of Patent Document 1. In FIG. 5, subpixels labeled with "H" have a higher luminance than subpixels without "H'" but have a lower luminance than the subpixels labeled with "H" in FIG. 3 and FIG. 4.

When the multi-pixel driving is not carried out, the CS signal voltages supplied to the storage capacitor bus lines 16a, 16b are, for example, DC voltages which have equal values. Herein, the "DC voltage" refers to a DC voltage, i.e., which has a constant potential, within one vertical scanning period. When the multi-pixel driving is not carried out, the storage capacitor bus lines 16a, 16b may not be supplied with a CS signal voltage. When the multi-pixel driving is not carried out, the CS signal voltages supplied to the storage capacitor bus lines 16a, 16b may be oscillating voltages which have identical waveforms.

From the viewpoint of suppressing display unevenness, it is preferred that the first type frame periods and the second type frame periods are included in equal proportions. The first type frame period and the second type frame period are switched at, for example, a predetermined interval not less than one frame period. The first type frame period and the second type frame period may be switched at an interval of, for example, one frame period. The first type frame period and the second type frame period may be switched at an interval of, for example, two frame periods, or may be switched with a still longer period, as a matter of course.

A configuration of the liquid crystal display panel 100 which is capable of switching the first type frame period and the second type frame period is described with again reference to FIG. 1.

The liquid crystal display panel 100 includes the TFT substrate 10 which has a display region demarcated by a plurality of pixels, a gate driving circuit 32 for supplying a gate signal voltage to the plurality of gate bus lines 12, a source driving circuit 34 for supplying a display signal voltage to the plurality of source bus lines 14a, 14b, and a frame period type switching circuit 33 for switching the combination of two pixel rows associated with each of a plurality of pixel row pairs.

Switching the combination of two pixel rows associated with each of a plurality of pixel row pairs refers to, for example, switching the waveforms of gate signal voltages Vg supplied to the gate bus lines 12 in each frame period (i.e., the timing at which gate signal voltage Vg transitions from LOW (VgL) to HIGH (VgH)) as shown in FIG. 6. By switching the waveforms of the gate signal voltages, the order (pattern) of scanning the gate bus lines in a frame period can be varied. Thus, the scan mode switching between scan mode A and scan mode B can be carried out, and the type of frame periods (first type and second type) can be switched.

A display control circuit 31 generates a gate signal voltage and a display signal voltage based on a grayscale level to be exhibited by each pixel which is given by an input display signal and outputs the gate signal voltage and the display signal voltage to the gate driving circuit 32 and the source driving circuit 34. The display control circuit 31 outputs a signal generated by the frame period type switching circuit 33 to the gate driving circuit 32 and the source driving circuit 34. The gate driving circuit 32 is capable of supplying gate signal voltages corresponding to respective ones of the first type frame period and the second type frame period.

For example, the display control circuit 31 may include the frame period type switching circuit 33. The frame period type switching circuit 33 may be configured by additionally providing a switching circuit or may be configured in combination with an existing circuit (e.g., the gate driving circuit 32). Switching between the first type frame period and the second type frame period may be realized by periodically alternating the first type frame period and the second type frame period, may be realized by randomly selecting the first type frame period and the second type frame period, or may be realized by forcedly switching from the first type frame period to the second type frame period or from the second type frame period to the first type frame period.

The gate driving circuit 32 and/or the source driving circuit 34 may be provided in, for example, a frame region (also referred to as "non-display region") surrounding the display region. The display control circuit 31 can further include, usually, a timing control circuit and a CS voltage control circuit for supplying a CS signal voltage to a plurality of storage capacitor bus lines 16a, 16b. The gate driving circuit 32 and the source driving circuit 34 are, for example, mounted to the TFT substrate 10 using a COF (chip on film) as illustrated in the drawing. The frame region of the liquid crystal display panel can include the COF. However, the present invention is not limited to this example. The gate driving circuit 32 and/or the source driving circuit 34 may be mounted to the TFT substrate 10 using a COG (chip on glass). The frame region of the liquid crystal display panel 100 may be included in the TFT substrate 10.

The length of the first type frame period, V(fA), and the length of the second type frame period, V(fB), are equal to each other, for example. In the above-described example, the first type frame period includes rp/2 pixel row pairs, and the second type frame period includes (rp/2+1) pixel row pairs. The first type frame period may include a vertical blanking interval V-Blank(fA) in which displaying is not carried out in addition to rp/2 horizontal scanning periods. The second type frame period may include a vertical blanking interval V-Blank(fB) in which displaying is not carried out in addition to (rp/2+1) horizontal scanning periods. By varying the lengths of the vertical blanking interval V-Blank(fA) and the vertical blanking interval V-Blank(fB) from each other, the length V(fA) of the first type frame period and the length V(fB) of the second type frame period can be equalized to each other.

The polarity of a display signal voltage supplied to the first source bus lines 14a and the polarity of a display signal voltage supplied to the second source bus lines 14b are each constant in, for example, each frame period. By appropriately adjusting the relationship in connection between the TFTs 18a, 18b and the source bus lines 14a, 14b and the polarity of the source bus lines 14a, 14b, occurrence of flicker can be suppressed.

In the example illustrated in FIG. 3 to FIG. 5, in each pixel column, TFTs 18a and 18b connected with one pixel P (p, q) are connected with a first source bus line 14a associated with the pixel column ($q^{th}$ column), and TFTs 18a and 18b connected with a pixel P (p+1, q) which adjoins the one pixel in the column direction are connected with a second source bus line 14b associated with the pixel column ($q^{th}$ column). In each pixel row, TFTs 18a and 18b connected with one pixel P (p, q) are connected with a first source bus line 14a associated with the pixel column ($q^{th}$ column), and TFTs 18a and 18b connected with a pixel (p, q+1) which adjoins the one pixel in the row direction are connected with a second source bus line 14b associated with the pixel column ((q+1)$^{th}$ column). The polarities of display signal voltages supplied to the first source bus lines 14a and the second source bus lines 14b associated with each pixel column are, for example, opposite to each other. In each frame period, the polarities of display signal voltages supplied to the plurality of first source bus lines 14a are, for example, equal to one another, and the polarities of display signal voltages supplied to the plurality of second source bus lines 14b are, for example, equal to one another. In this case, the liquid crystal display panel 100 exhibits a one-row, one-column dot inversion state in each frame period, and therefore, occurrence of flicker can be suppressed.

The embodiment of the present invention is not limited to the above-described example. In each frame period, the liquid crystal display panel 100 may exhibit a two-row, one-column dot inversion state or may exhibit an N-row, one-column dot inversion state (N is an integer not less than 3). The relationship in connection between the TFTs 18a, 18b and the source bus lines 14a, 14b and the polarity of the source bus lines 14a, 14b for the purpose of suppressing occurrence of flicker are disclosed in International Application PCT/JP2016/081086 of the present applicant. The entire disclosure of International Application PCT/JP2016/081086 is incorporated by reference in this specification.

It is preferred that the polarities of the display signal voltages supplied to the plurality of first source bus lines 14a and the plurality of second source bus lines 14b each invert at a predetermined interval not less than one frame period. With such an arrangement, high quality display can be obtained. For example, when the refresh rate (driving frequency) of the liquid crystal display panel is 60 Hz, the predetermined interval is preferably one frame period. When the refresh rate of the liquid crystal display panel is 120 Hz, the predetermined interval is preferably two frame periods. When the refresh rate of the liquid crystal display panel is 240 Hz, the predetermined interval is preferably four frame periods. When the refresh rate of the liquid crystal display panel is K×60 Hz, the predetermined interval is preferably K times or 2×K times the frame period. Herein, the refresh rate is a frequency which is obtained from the inverse of the length of the frame period.

Next, the liquid crystal display panel 100 in which the multi-pixel driving is carried out is described with reference to FIG. 7 to FIG. 9. In the following section, the differences from the liquid crystal display panel 100 in which the above-described multi-pixel driving is not carried out are mainly described.

Figure 7:
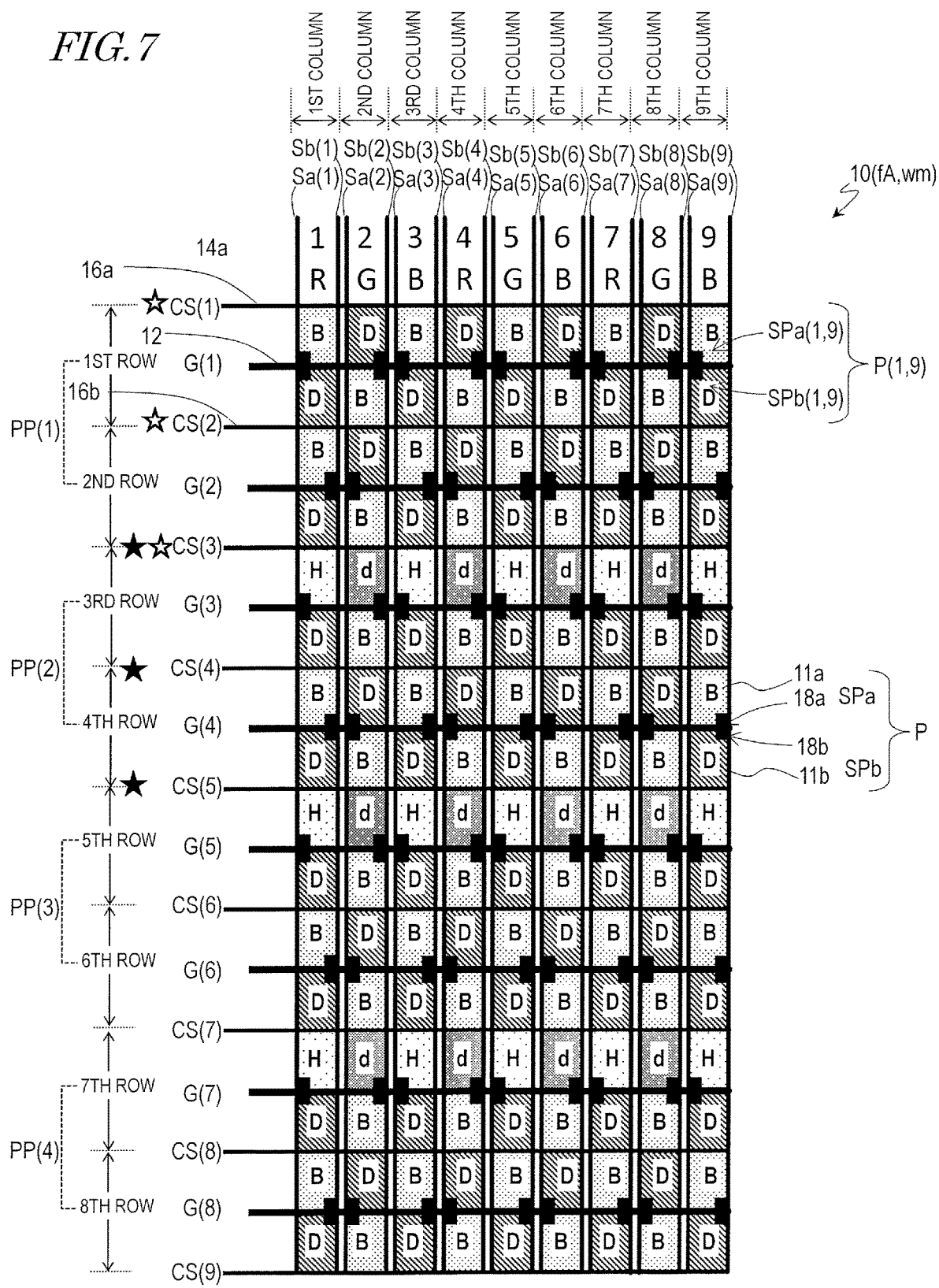
FIG. 7 is a diagram schematically showing the TFT substrate 10 used in the liquid crystal display panel 100.
Figure 8:
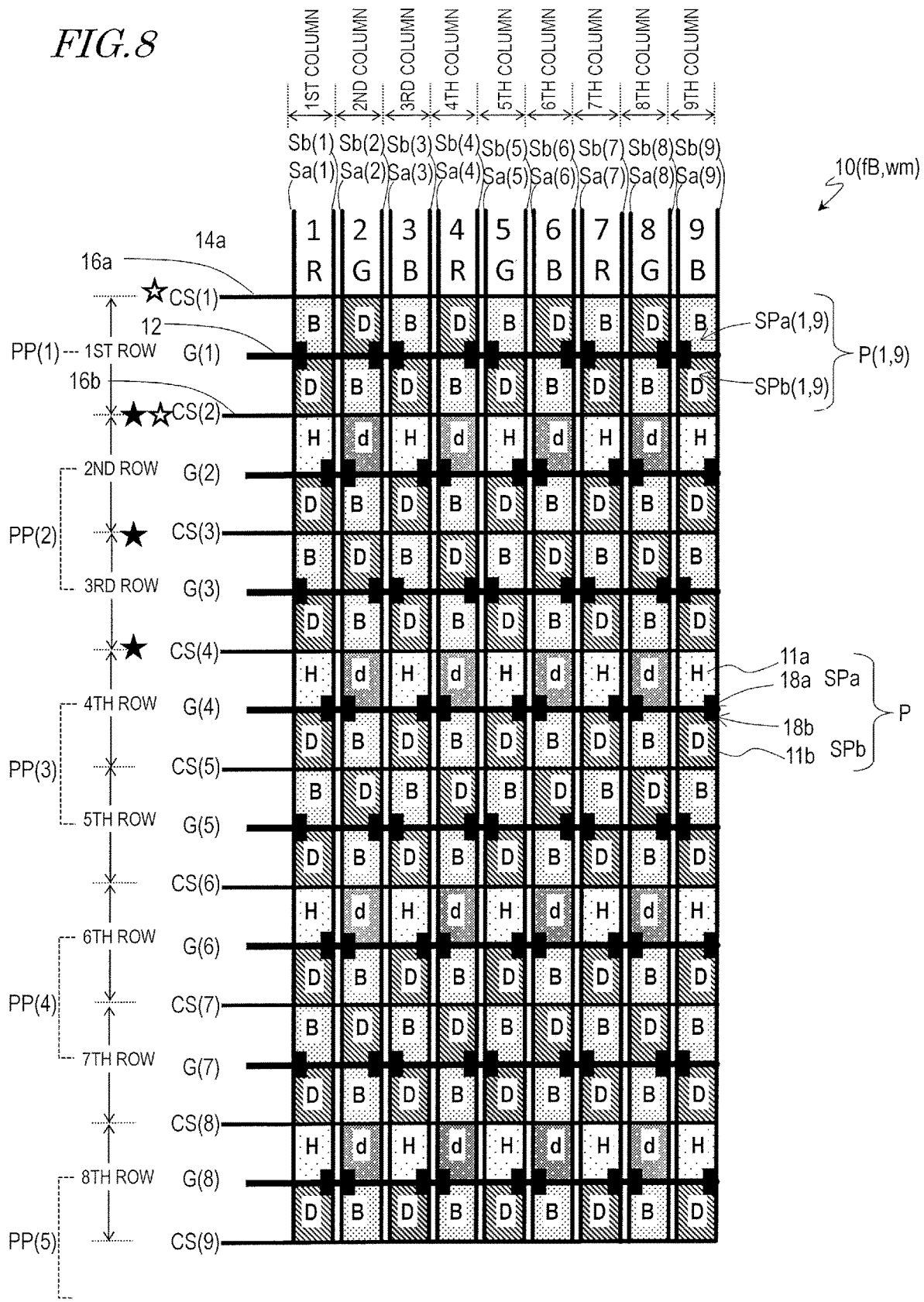
FIG. 8 is a diagram schematically showing the TFT substrate 10 used in the liquid crystal display panel 100.
Figure 9:
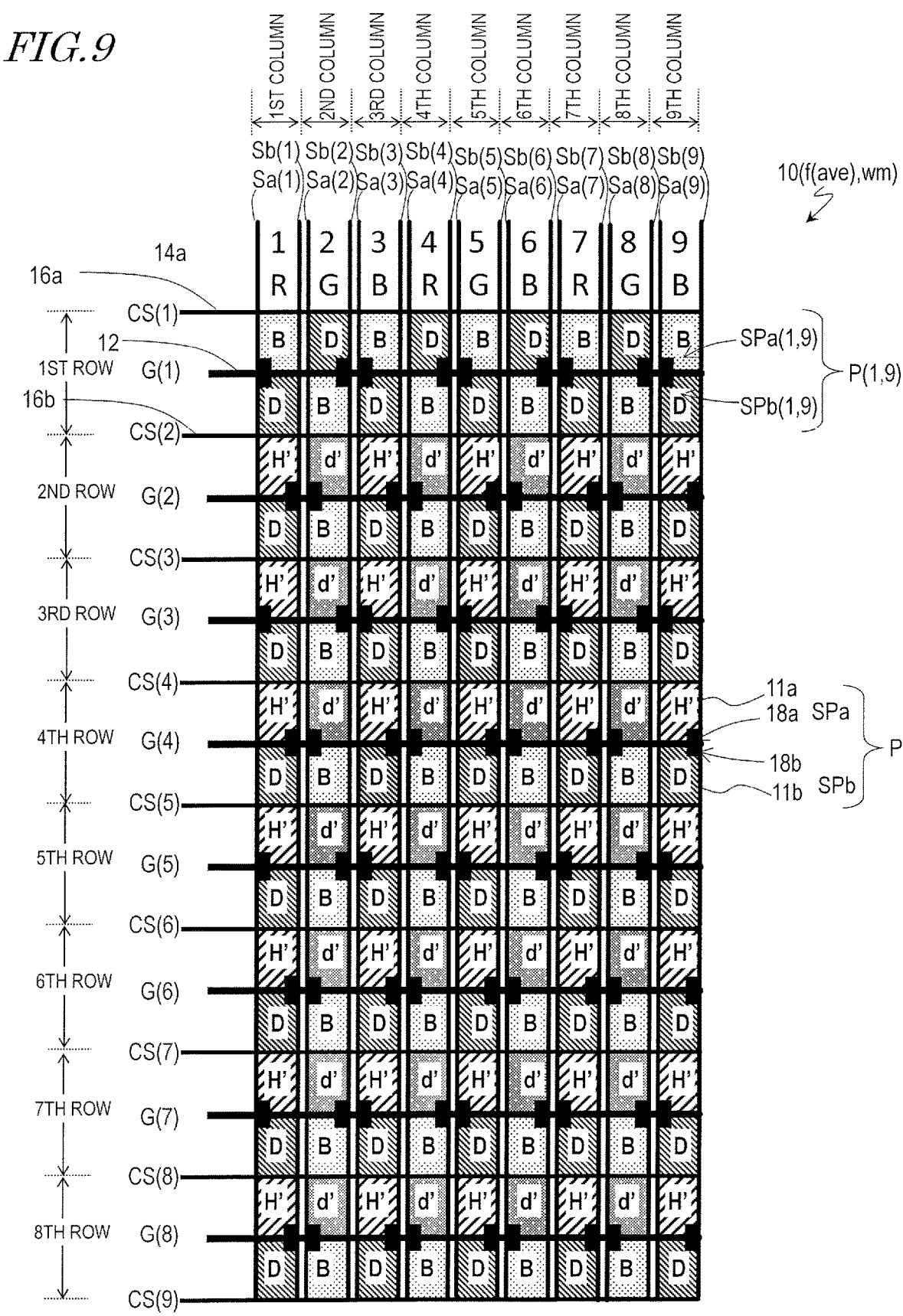
FIG. 9 is a diagram schematically showing the TFT substrate 10 used in the liquid crystal display panel 100.

FIG. 7 to FIG. 9 are diagrams schematically showing the TFT substrate 10 used in the liquid crystal display panel 100 in which the multi-pixel driving is carried out. FIG. 7 schematically illustrates a display state in one frame period (first type frame period). FIG. 8 schematically illustrates a display state in one frame period (second type frame period). FIG. 9 schematically illustrates the average of the display states of respective frame periods. The suffix "wm" in parentheses to the reference numeral of a TFT substrate means that the multi-pixel driving is carried out in the TFT substrate.

The waveforms of gate signal voltages for achieving the display states shown in FIG. 7 and FIG. 8 are the same as those shown in FIG. 6.

In a liquid crystal display panel in which the multi-pixel driving is carried out, for example, the CS signal voltages supplied to the storage capacitors of two subpixels are varied from each other, whereby the effective voltages applied across the liquid crystal layers of the two subpixel are varied from each other. Specifically, after predetermined display signal voltages are supplied to two subpixel electrodes, TFTs turn OFF, thereby the subpixel electrodes are electrically separated from the source bus line. After that, each storage capacitor counter voltage varies, the variation (including the direction and the sign of the variation) being differing between the two subpixels, whereby the effective voltages applied across the liquid crystal layers of the two subpixels are different from each other.

In each pixel of the liquid crystal display panel 100, the storage capacitor 22a of the first subpixel SPa and the storage capacitor 22b of the second subpixel SPb are connected with different storage capacitor bus lines 16a, 16b and are supplied with different oscillating voltages from the storage capacitor bus lines 16a and 16b. Herein, the "oscillating voltage" refers to a voltage whose oscillation period is shorter than one vertical scanning period unless otherwise specified. The oscillating voltages are typically voltages whose phases are different by 180° between the storage capacitor bus line 16a and the storage capacitor bus line 16b. Herein, the storage capacitor bus lines 16a and 16b are electrically independent of the gate bus line 12. In the entire liquid crystal display panel 100, storage capacitor bus lines include, for example, 12 types which are electrically independent of each other, such as the storage capacitor bus lines 16a and 16b, so that one of the CS signal voltages is supplied to each storage capacitor electrode of a corresponding subpixel based on the phases of the CS signal voltages (storage capacitor voltages). For example, 12 types of CS signal voltages are supplied from 12 storage capacitor trunk lines to each storage capacitor bus line 16a, 16b.

Since the waveforms of the gate signal voltages are the same as those shown in FIG. 6 where the multi-pixel driving is not carried out, the subpixel rows which have high luminance due to a ripple voltage are the same as those in the case where the multi-pixel driving is not carried out. For example, in the first type frame period shown in FIG. 7, in the third and fourth pixel rows, the luminance of the first subpixel SPa of the third row is higher than the luminances of the other subpixels as previously described with reference to FIG. 3. In the second type frame period shown in FIG. 8, in the second and third pixel rows, the luminance of the first subpixel SPa of the second row is higher than the luminances of the other subpixels as previously described with reference to FIG. 4. Note that, however, when the multi-pixel driving is carried out and a one-row, one-column dot inversion state is exhibited, bright subpixels ("B" in FIG. 7 to FIG. 9) and dark subpixels ("D" in FIG. 7 to FIG. 9) alternately occur in the pixel row direction. For example, as shown in FIG. 7, of the first subpixels SPa of the third row which have a high luminance, bright subpixels are labeled with "H", and dark subpixel are labeled with "d". In FIG. 7 and FIG. 8, "H" means that the subpixel has a higher luminance than the other bright subpixels "B". In FIG. 7 and FIG. 8, "d" means that the subpixel has a higher luminance than the other dark subpixels "D". Ones of these subpixels which are perceived as display unevenness are bright subpixels "H". The bright subpixels "H" constitute a half of one subpixel row, and a subpixel row of high display luminance occurs in every two pixel rows. Therefore, when a plurality of frame periods include only first type frame periods, i.e., when each frame period is scanned in the same scan mode (scan mode A), display unevenness occurs, and this display unevenness can be disadvantageously conspicuous.

According to the embodiment of the present invention, this problem is solved. Specifically, in the second type frame period, bright pixel rows are different from those in the first type frame period, and as a result, display unevenness which occurs in every two pixel rows is suppressed by averaging the display states of respective frame periods. FIG. 9 schematically illustrates the average of the display luminances of respective pixels in the first type frame period and the display luminances of respective pixels in the second type frame period. When the display states of respective frame periods are averaged as shown in FIG. 9, pixels which become bright due to a ripple voltage occur in every pixel row, and the luminance thereof is reduced. Therefore, the display unevenness is inconspicuous. In FIG. 9, bright subpixels labeled with "H'" have a higher luminance than bright subpixels "B" but have a lower luminance than the bright subpixels labeled with "H" in FIG. 7 and FIG. 8. In FIG. 9, bright subpixels "H'" occur in every pixel row, while in FIG. 7 and FIG. 8 bright subpixels "H" occur in every two pixel rows. With this arrangement, the above-described display unevenness is suppressed. In FIG. 9, dark subpixels labeled with "d'" have a higher luminance than dark subpixels "D" but have a lower luminance than the dark subpixels labeled with "d" in FIG. 7 and FIG. 8.

When the multi-pixel driving is carried out, the liquid crystal display panel 100 may not necessarily exhibit a one-row, one-column dot inversion state. Occurrence of the above-described problem to be solved by the present invention is not limited to the case where the liquid crystal display panel 100 exhibits a one-row, one-column dot inversion state. For example, in each frame period, the liquid crystal display panel 100 may exhibit a one-column inversion state or a one-row inversion state.

The embodiment of the present invention is not limited to the previously-illustrated liquid crystal display panel 100. Occurrence of the above-described problem is not limited to the previously-illustrated liquid crystal display panel. The problem to be solved by the embodiment of the present invention can occur in a liquid crystal display panel which meets the following conditions: (1) The liquid crystal display panel is driven by a driving method which simultaneously selects two pixel rows, and (2) includes a storage capacitor bus line which is electrically connected with both any of pixel rows of the n–: selection and any of pixel rows of the (n+1)$^{th}$ selection. Such a liquid crystal display panel can have the above-described problem of display unevenness. Thus, the above-described problem can be solved when the liquid crystal display panel includes the first type frame period and the second type frame period between which the combination of pixel rows associated with each pixel row pair is different.

For example, the combination of pixel rows associated with each pixel row pair is not limited to the above-described example. For example, as in a liquid crystal display device of FIG. 35 of Patent Document 1, the liquid crystal display panel may include, as the first type frame period, a frame period in which pixel rows are selected in such an order that the first and third pixel rows are selected in the first horizontal scanning period, the second and fourth pixel rows are selected in the second horizontal scanning period, the fifth and seventh pixel rows are selected in the third horizontal scanning period, the sixth and eighth pixel rows are selected in the fourth horizontal scanning period, and so on. The plurality of pixel row pairs included in the first type frame period are represented as PP(n)=(2×n–1, 2×n+1) (when n is an odd number) or PP(n)=(2×n–2, 2×n) (when n is an even number). In this case, in the second type frame period, for example, the pixel rows may be selected in such an order that the second and fourth pixel rows are selected in the first horizontal scanning period, the first and third pixel rows are selected in the second horizontal scanning period, the sixth and eighth pixel rows are selected in the third horizontal scanning period, the fifth and seventh pixel rows are selected in the fourth horizontal scanning period, and so on. That is, the plurality of pixel row pairs included in the second type frame period can be represented as PP(n)=(2×n, 2×n+2) (when n is an odd number) or PP(n)=(2×n–3, 2×n–1) (when n is an even number).

The liquid crystal display panel 100 of the present embodiment can suppress display unevenness but can cause a problem described below.

In the first type frame period and the second type frame period, the duration of supply of a display signal voltage to each pixel can sometimes vary depending on the frame period type due to the difference in the order (pattern) of scanning the gate bus lines. For example, referring to gate signal voltage Vg(2) shown in FIG. 6, it can be seen that the duration for which a pixel selected by gate signal voltage Vg(2) exhibits a grayscale level based on a display signal voltage varies between the first type frame period in which scan mode A is carried out and the second type frame period in which scan mode B is carried out. For example, when driven by such a driving method that the first type frame period and the second type frame period are switched at intervals of one frame period and that the polarity of display signal voltages supplied to the source bus lines 14*a*, 14*b* are inverted at intervals of one period, the combination of the frame period type (first type or second type) and the polarity of display signal voltages is fixed. Some pixels can have such a problem that the duration of the positive (+) polarity and the duration of the negative (–) polarity of the display signal voltage are not equal to each other.

Figure 10:
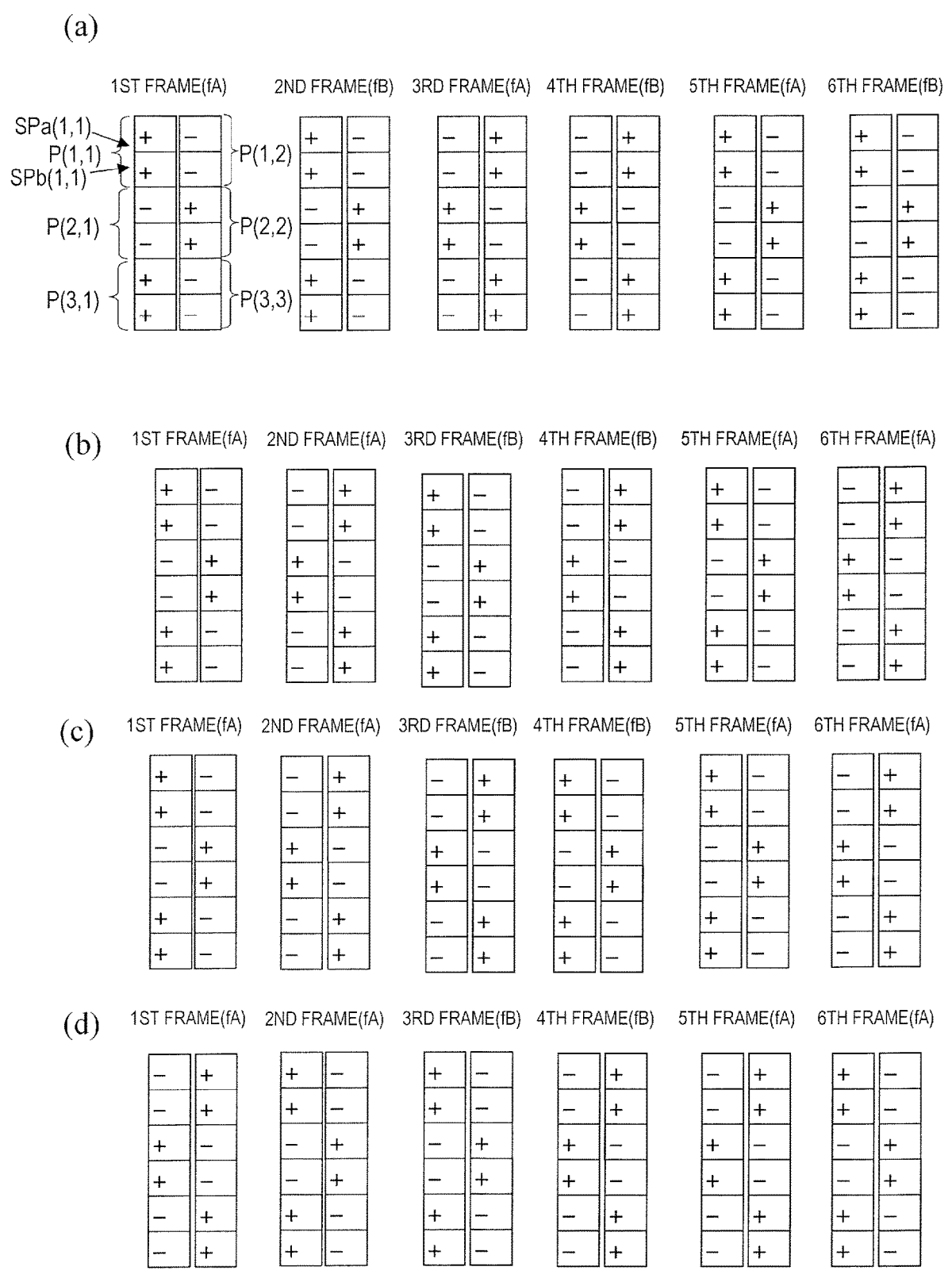
Figure 11:
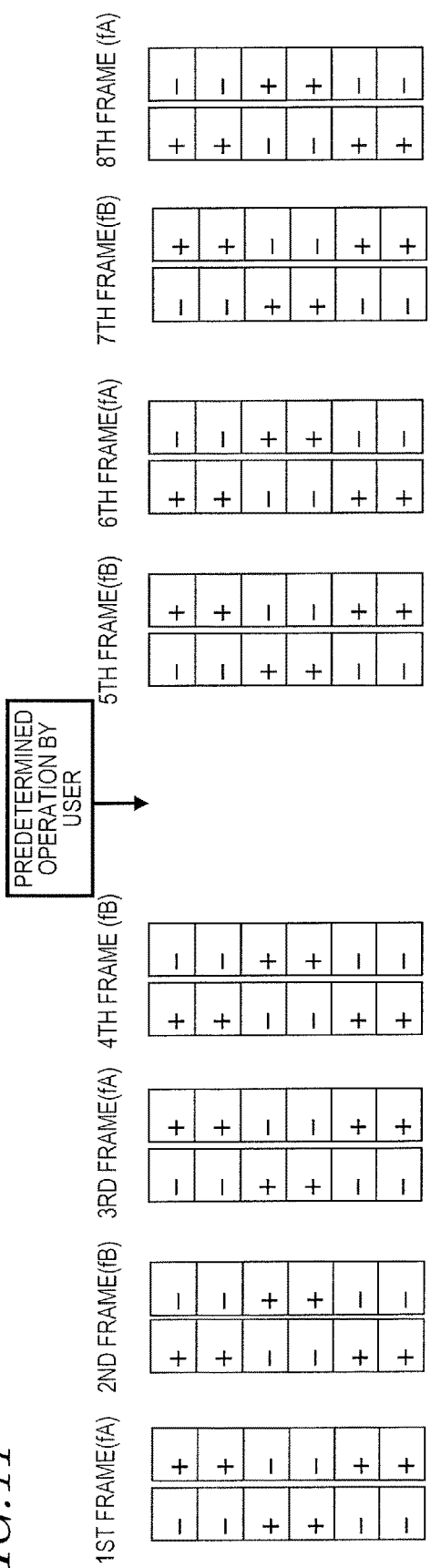
FIGS. 11(a) and 11(b) are diagrams illustrating the frame period type (first type or second type) and the change in polarity of display signal voltages in the liquid crystal display panel 100.
Figure 11:
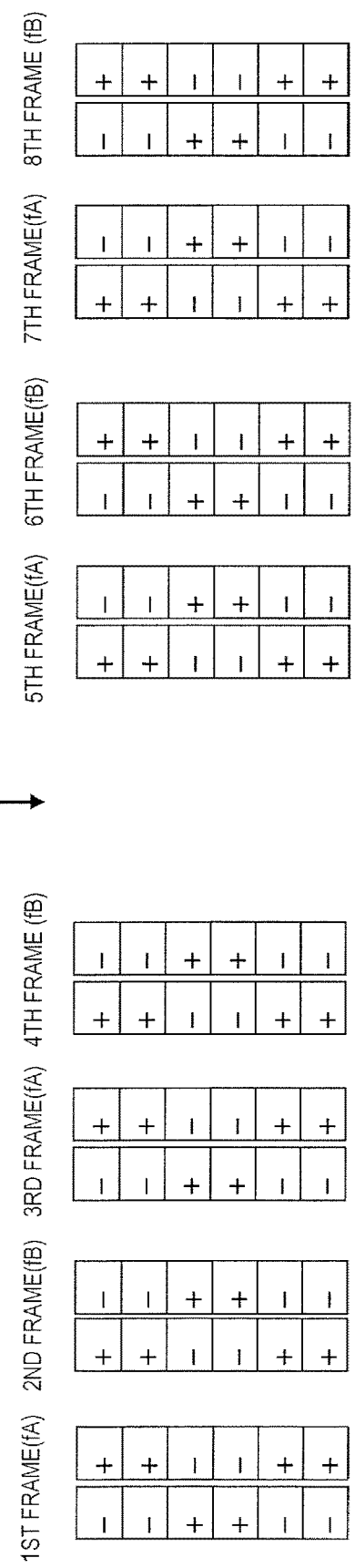

To achieve high quality display, the driving method of the liquid crystal display panel 100 is preferably configured such that the combination of the frame period type (first type or second type) and the polarity of display signal voltages is not fixed. For example, the following methods are possible. The frame period type (first type or second type) and the change in polarity of the display signal voltage in the liquid crystal display panel 100 of the present embodiment are described with reference to FIG. 10 and FIG. 11. FIG. 10 and FIG. 11 show the polarity ("+" or "–") of a display signal voltage supplied to each pixel in each frame period and whether it is the first type frame period (labeled with "fA") or the second type frame period (labeled with "fB").

The first method is to make the period with which the first type frame period and the second type frame period are switched and the period with which the polarity of a display signal voltage is inverted different. For example, as shown in FIG. 10(*a*), the first type frame period and the second type frame period can be switched at intervals of one frame period (the period is two frame periods), and the polarity of the display signal voltage can be inverted at intervals of two frame periods (the period is four frame periods). For example, as shown in FIG. 10(*b*), the first type frame period and the second type frame period can be switched at intervals of two frame periods (the period is four frame periods), and the polarity of the display signal voltage can be inverted at intervals of one frame period (the period is two frame periods). Note that "switching the first type frame period and the second type frame period" means switching the frame period type between the first type and the second type, i.e., refers to switching of the scan mode between scan mode A and scan mode B.

The second method is to make the timing at which the first type frame period and the second type frame period are switched and the timing at which the polarity of the display signal voltage is inverted different, while the period with which the first type frame period and the second type frame period are switched is equal to the period with which the polarity of a display signal voltage is inverted, as shown in FIGS. 10(c) and 10(d).

The third method is to switch the combination of the frame period type (first type or second type) and the polarity of a display signal voltage in response to a predetermined operation by a user. For example, as shown in FIG. 11(a), switching of the frame period type (first type or second type) and inversion of the polarity of the display signal voltage are carried out with equal periods, and only the frame period type (first type or second type) is randomly or forcedly switched when the power is ON. Alternatively, as shown in FIG. 11(b), switching of the frame period type (first type or second type) and inversion of the polarity of the display signal voltage are carried out with equal periods, and only the polarity of the display signal voltage is randomly or forcedly switched when the power is ON. The predetermined operation by a user is, for example, not limited to the time when the power is ON but may occur when the channel is changed or when the input is changed. At the timing when the entire screen changes in response to such a predetermined operation by a user, the entire screen changes. Therefore, even when the above-described switching is carried out, it cannot be distinguished from the change of the entire screen, so that a viewer would not experience a sense of incongruity.

As a matter of course, the first to third methods which have been described above may be used in combination.

The TFTs of the liquid crystal display panel 100 of the embodiment of the present invention may be a known TFT, such as amorphous silicon TFT (a-Si TFT), polysilicon TFT (p-Si TFT), microcrystalline silicon TFT (µC-Si TFT), or the like. Using a TFT which includes an oxide semiconductor (oxide TFT) is preferred.

The oxide semiconductor included in the oxide semiconductor layer may be an amorphous oxide semiconductor or may be a crystalline oxide semiconductor which includes a crystalline portion. Examples of the crystalline oxide semiconductor include a polycrystalline oxide semiconductor, a microcrystalline oxide semiconductor, and a crystalline oxide semiconductor in which the c-axis is aligned generally perpendicular to the layer surface.

The oxide semiconductor layer may have a multilayer structure consisting of two or more layers. When the oxide semiconductor layer has a multilayer structure, the oxide semiconductor layer may include a non-crystalline oxide semiconductor layer and a crystalline oxide semiconductor layer. Alternatively, the oxide semiconductor layer may include a plurality of crystalline oxide semiconductor layers which have different crystalline structures. The oxide semiconductor layer may include a plurality of non-crystalline oxide semiconductor layers. When the oxide semiconductor layer has a two-layer structure which includes the upper layer and the lower layer, it is preferred that the energy gap of the oxide semiconductor included in the upper layer is greater than the energy gap of the oxide semiconductor included in the lower layer. Note that, however, when the difference in energy gap between these layers is relatively small, the energy gap of the oxide semiconductor of the lower layer may be greater than the energy gap of the oxide semiconductor of the upper layer.

The materials, structures and film formation methods of the non-crystalline oxide semiconductor and the respective aforementioned crystalline oxide semiconductors, and the configuration of the oxide semiconductor layer which has a multilayer structure, are disclosed in, for example, Japanese Laid-Open Patent Publication No. 2014-007399. The entire disclosure of Japanese Laid-Open Patent Publication No. 2014-007399 is incorporated by reference in this specification.

The oxide semiconductor layer may include, for example, at least one metal element among In, Ga and Zn. The oxide semiconductor layer includes, for example, an In—Ga—Zn—O based semiconductor (e.g., indium gallium zinc oxide). Here, the In—Ga—Zn—O based semiconductor is a ternary oxide including In (indium), Ga (gallium) and Zn (zinc). The proportion (composition ratio) of In, Ga and Zn is not particularly limited but includes, for example, In:Ga:Zn=2:2:1, In:Ga:Zn=1:1:1, and In:Ga:Zn=1:1:2. The oxide semiconductor layer which has such a composition can be formed by an oxide semiconductor film which includes an In—Ga—Zn—O based semiconductor. Note that a channel-etch type TFT which includes an active layer which includes an oxide semiconductor, such as an In—Ga—Zn—O based semiconductor, is also referred to as "CE-OS-TFT".

The In—Ga—Zn—O based semiconductor may be amorphous or may be crystalline. As the crystalline In—Ga—Zn—O based semiconductor, a crystalline In—Ga—Zn—O based semiconductor in which the c-axis is aligned generally perpendicular to the layer surface is preferred.

The crystalline structure of the crystalline In—Ga—Zn—O based semiconductor is disclosed in, for example, Japanese Laid-Open Patent Publication No. 2014-007399, Japanese Laid-Open Patent Publication No. 2012-134475, and Japanese Laid-Open Patent Publication No. 2014-209727. The entire disclosures of Japanese Laid-Open Patent Publication No. 2012-134475 and Japanese Laid-Open Patent Publication No. 2014-209727 are incorporated by reference in this specification. A TFT which includes an In—Ga—Zn—O based semiconductor layer has high mobility (20 times or more as compared with an a-Si TFT) and low current leakage (less than $\frac{1}{100}$ as compared with an a-Si TFT), and is therefore suitably used as a driver TFT (e.g., a TFT included in a driving circuit provided around the display region including a plurality of pixels on the same substrate as the display region) and a pixel TFT (a TFT provided in a pixel).

The oxide semiconductor layer may include a different oxide semiconductor instead of the In—Ga—Zn—O based semiconductor. For example, the oxide semiconductor layer may include an In—Sn—Zn—O based semiconductor (e.g., $In_2O_3$—$SnO_2$—ZnO; InSnZnO). The In—Sn—Zn—O based semiconductor is a ternary oxide including In (indium), Sn (tin) and Zn (zinc). Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, a CdO (cadmium oxide), a Mg—Zn—O based semiconductor, an In—Ga—Sn—O based semiconductor, an In—Ga—O based semiconductor, a Zr—In—Zn—O based semiconductor, a Hf—In—Zn—O based semiconductor, an Al—Ga—Zn—O based semiconductor, a Ga—Zn—O based semiconductor, or the like.

Hereinafter, an active matrix substrate (TFT substrate) used in a liquid crystal display panel of another embodiment of the present invention is described with reference to the drawings. The active matrix substrate of the present embodiment is an active matrix substrate which includes oxide semiconductor TFTs and crystalline silicon TFTs on the same substrate.

The active matrix substrate includes a TFT (pixel TFT) in each pixel. As the pixel TFT, an oxide semiconductor TFT which includes, for example, an In—Ga—Zn—O based semiconductor film as the active layer is used.

Part or the entirety of the peripheral driving circuit may be integrally formed on the same substrate as the pixel TFTs. Such an active matrix substrate is referred to as a driver-monolithic active matrix substrate. In the driver-monolithic active matrix substrate, the peripheral driving circuit is provided in a region (non-display region or frame region) exclusive of a region including a plurality of pixels (display region). TFTs which are constituents of the peripheral driving circuit (circuit TFTs) are, for example, crystalline silicon TFTs which include a polycrystalline silicon film as the active layer. Thus, when oxide semiconductor TFTs are used as the pixel TFTs and crystalline silicon TFTs are used as the circuit TFTs, the power consumption can be reduced in the display region, and further, the frame region can be reduced.

Next, a more specific configuration of the active matrix substrate of the present embodiment is described with reference to the drawings.

Figure 14:
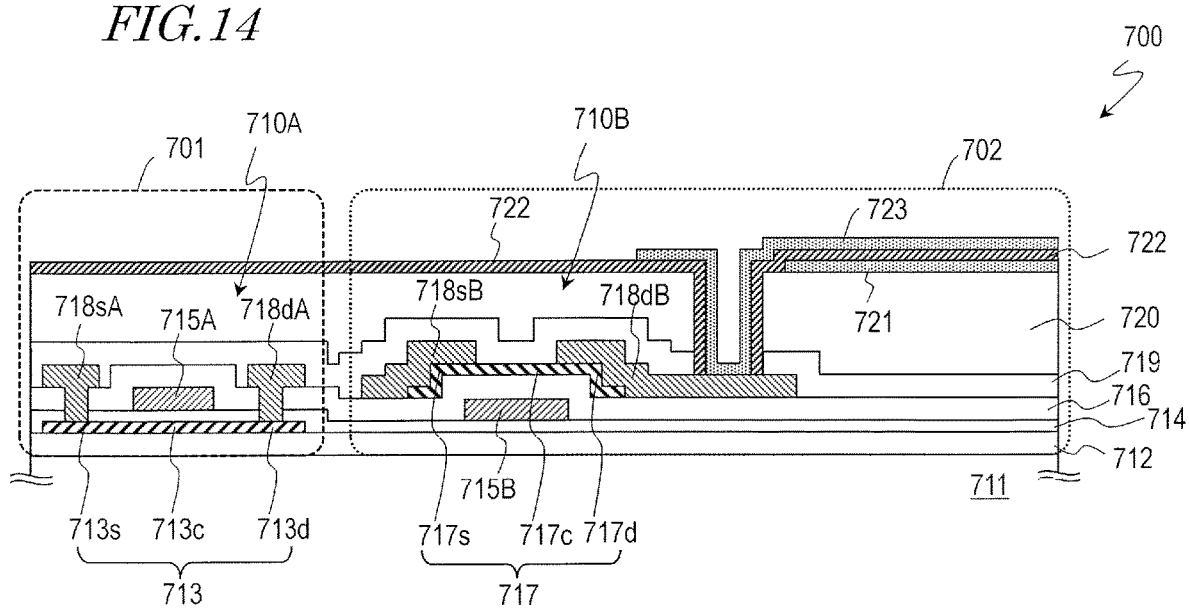
FIG. 14 is a cross-sectional view of a crystalline silicon TFT 710A and an oxide semiconductor TFT 710B in an active matrix substrate 700 used in a liquid crystal display panel of another embodiment of the present invention.

FIG. 14 is a cross-sectional view showing a cross-sectional configuration of a crystalline silicon TFT (hereinafter, referred to as "first thin film transistor") 710A and an oxide semiconductor TFT (hereinafter, referred to as "second thin film transistor") 710B in the active matrix substrate (TFT substrate) 700 of the present embodiment.

The active matrix substrate 700 includes a display region 702 including a plurality of pixels and a region exclusive of the display region 702 (non-display region). The non-display region includes a driving circuit formation region 701 in which the driving circuit is to be provided. In the driving circuit formation region 701, part or the entirety of the gate driving circuit 32 shown in FIG. 1 is provided. In the driving circuit formation region 701, part or the entirety of the source driving circuit 34 shown in FIG. 1 may be further provided.

As shown in FIG. 14, in the active matrix substrate 700, the second thin film transistor 710B is provided as a pixel TFT in each pixel of the display region 702, and the first thin film transistor 710A is provided as a circuit TFT in the driving circuit formation region 701.

The present embodiment is applicable to any of the above-described liquid crystal display panels. For example, the second thin film transistor 710B of the present embodiment can be used as the TFTs 18a, 18b which have previously been described with reference to FIG. 2 to FIG. 5 and FIG. 7 to FIG. 9.

The active matrix substrate 700 includes a substrate 711, an underlayer film 712 provided on the surface of the substrate 711, a first thin film transistor 710A provided on the underlayer film 712, and a second thin film transistor 710B provided on the underlayer film 712. The first thin film transistor 710A is a crystalline silicon TFT in which the active region includes crystalline silicon as a major constituent. The second thin film transistor 710B is an oxide semiconductor TFT in which the active region includes an oxide semiconductor as a major constituent. The first thin film transistor 710A and the second thin film transistor 710B are integrally formed in the substrate 711. The "active region" mentioned herein refers to part of a semiconductor layer that is to be the active layer of the TFT in which a channel is to be formed.

The first thin film transistor 710A includes a crystalline silicon semiconductor layer (e.g., low-temperature polysilicon layer) 713 provided on the underlayer film 712, a first insulating layer 714 covering the crystalline silicon semiconductor layer 713, and a gate electrode 715A provided on the first insulating layer 714. Part of the first insulating layer 714 which is present between the crystalline silicon semiconductor layer 713 and the gate electrode 715A functions as the gate insulating film of the first thin film transistor 710A. The crystalline silicon semiconductor layer 713 includes a region 713c in which a channel is to be formed (active region) and a source region 713s and a drain region 713d which are located at opposite sides of the active region. In this example, part of the crystalline silicon semiconductor layer 713 overlapping the gate electrode 715A with the first insulating layer 714 interposed therebetween forms an active region 713c. The first thin film transistor 710A also includes a source electrode 718sA and a drain electrode 718dA which are connected with the source region 713s and the drain region 713d, respectively. The source and drain electrodes 718sA, 718dA may be provided on an interlayer insulating film (herein, a second insulating layer 716) that covers the gate electrode 715A and the crystalline silicon semiconductor layer 713 so as to be connected with the crystalline silicon semiconductor layer 713 in a contact hole formed in the interlayer insulating film.

The second thin film transistor 710B includes a gate electrode 715B provided on the underlayer film 712, a second insulating layer 716 covering the gate electrode 715B, and an oxide semiconductor layer 717 provided on the second insulating layer 716. As illustrated, the first insulating layer 714 which is the gate insulating film of the first thin film transistor 710A may be extended to a region in which the second thin film transistor 710B is to be formed. In this case, the oxide semiconductor layer 717 may be provided on the first insulating layer 714. Part of the second insulating layer 716 which is present between the gate electrode 715B and the oxide semiconductor layer 717 functions as the gate insulating film of the second thin film transistor 710B. The oxide semiconductor layer 717 includes a region 717c in which a channel is to be formed (active region) and a source contact region 717s and a drain contact region 717d which are located at opposite sides of the active region. In this example, part of the oxide semiconductor layer 717 overlapping the gate electrode 715B with the second insulating layer 716 interposed therebetween forms an active region 717c. The second thin film transistor 710B further includes a source electrode 718sB and a drain electrode 718dB which are connected with the source contact region 717s and the drain contact region 717d, respectively. Note that the second thin film transistor 710B can alternatively be configured such that the underlayer film 712 is not provided on the substrate 711.

The thin film transistors 710A, 710B are covered with a passivation film 719 and a flattening film 720. In the second thin film transistor 710B which functions as a pixel TFT, the gate electrode 715B is connected with a gate bus lines (not shown), the source electrode 718sB is connected with a source bus line (not shown), and the drain electrode 718dB is connected with a pixel electrode 723. In this example, the drain electrode 718dB is connected with a corresponding pixel electrode 723 in an opening formed in the passivation film 719 and the flattening film 720. A video signal is supplied to the source electrode 718sB via the source bus line, and a necessary charge is written in the pixel electrode 723 based on a gate signal from the gate bus lines.

As illustrated, a transparent electrically-conductive layer 721 may be provided as a common electrode on the flattening film 720, and the third insulating layer 722 may be provided between the transparent electrically-conductive layer (common electrode) 721 and the pixel electrode 723. In this case, the pixel electrode 723 may have an opening in the form of a slit. Such an active matrix substrate 700 is applicable to, for example, FFS (Fringe Field Switching) mode display devices.

In the illustrated example, the first thin film transistor 710A has a top gate configuration where the crystalline silicon semiconductor layer 713 is provided between the gate electrode 715A and the substrate 711 (underlayer film 712). On the other hand, the second thin film transistor 710B has a bottom gate configuration where the gate electrode 715B is provided between the oxide semiconductor layer 717 and the substrate 711 (underlayer film 712). By using such a configuration, increase in the number of manufacturing steps and the manufacturing cost can be effectively suppressed in integrally forming two different types of thin film transistors 710A, 710B on the same substrate 711.

The TFT configuration of the first thin film transistor 710A and the second thin film transistor 710B is not limited to the above-described examples.

INDUSTRIAL APPLICABILITY

The present invention can be widely utilized as a liquid crystal display panel and a driving method thereof, and particularly a large-size liquid crystal display panel for high-definition television applications and a driving method thereof.

REFERENCE SIGNS LIST

10 TFT substrate
12 gate bus line
14a, 14b source bus line (first and second source bus lines)
16a, 16b storage capacitor bus line
18a, 18b TFT
100 liquid crystal display panel

The invention claimed is:

1. A liquid crystal display panel, comprising:
a plurality of pixels arranged in a matrix including a plurality of rows and a plurality of columns, each of the plurality of pixels including a first subpixel and a second subpixel arranged so as to adjoin each other in a column direction;
a plurality of TFTs each connected with any of the first subpixels and the second subpixels included in the plurality of pixels;
a plurality of gate bus lines each associated with any of a plurality of pixel rows included in the plurality of pixels;
a plurality of first source bus lines and a plurality of second source bus lines each associated with any of a plurality of pixel columns included in the plurality of pixels; and
a plurality of storage capacitor bus lines each connected with any of storage capacitors of the first subpixels and the second subpixels included in the plurality of pixels,
wherein the plurality of pixels are arranged such that the first subpixel of one pixel and the second subpixel of a pixel which adjoins the one pixel in the column direction adjoin each other,
the plurality of storage capacitor bus lines include a storage capacitor bus line connected with a storage capacitor of the first subpixel of the one pixel and with a storage capacitor of the second subpixel of the pixel which adjoins the one pixel in the column direction,
in any given frame period, the plurality of pixels include a plurality of pixel row pairs each associated with two selected pixel rows among the plurality of pixel rows, the plurality of pixel row pairs being each simultaneously selected,
in each pixel column, one pixel of each of the plurality of pixel row pairs is connected with the first source bus line associated with the pixel column, and the other pixel is connected with the second source bus line associated with the pixel column, and
when the liquid crystal display panel operates over a plurality of frame periods, the plurality of frame periods include a first type frame period and a second type frame period differing in terms of combinations of two pixel rows to be associated with each of the plurality of pixel row pairs, wherein
a period with which the first type frame period and the second type frame period are switched and a period with which a polarity of a display signal voltage supplied to each of the plurality of first source bus lines and to each of the plurality of second source bus lines is inverted are equal to each other, and
a timing at which the first type frame period and the second type frame period are switched and a timing at which a polarity of a display signal voltage supplied to each of the plurality of first source bus lines and to each of the plurality of second source bus lines is inverted are different from each other.

2. The liquid crystal display panel of claim 1, wherein the first type frame period and the second type frame period are switched at a predetermined interval not less than one frame period.

3. The liquid crystal display panel of claim 1, wherein in each frame period, a polarity of a display signal voltage supplied to each of the plurality of first source bus lines does not vary, and a polarity of a display signal voltage supplied to each of the plurality of second source bus lines does not vary.

4. The liquid crystal display panel of claim 1, wherein a polarity of a display signal voltage supplied to each of the plurality of first source bus lines and a polarity of a display signal voltage supplied to each of the plurality of second source bus lines are inverted at a predetermined interval not less than one frame period.

5. The liquid crystal display panel of claim 1, wherein where the plurality of pixel rows include 1st to $rp^{th}$ pixel rows, each of the plurality of pixel row pairs in the first type frame period is associated with a $(2 \times m-1)^{th}$ row and a $(2 \times m)^{th}$ row (m is an integer not less than 1), and each of the plurality of pixel row pairs in the second type frame period is associated with a $(2 \times n-2)^{th}$ row and a $(2 \times n-1)^{th}$ row (n is an integer not less than 1).

6. The liquid crystal display panel of claim 1, further comprising:

a gate driving circuit for supplying a gate signal voltage to the plurality of gate bus lines;
a source driving circuit for supplying a display signal voltage to the plurality of first source bus lines and the plurality of second source bus lines; and
a frame period type switching circuit for switching the combination of two pixel rows associated with each of the plurality of pixel row pairs.

7. A liquid crystal display panel, comprising:
a plurality of pixels arranged in a matrix including a plurality of rows and a plurality of columns, each of the plurality of pixels including a first subpixel and a second subpixel arranged so as to adjoin each other in a column direction;
a plurality of TFTs each connected with any of the first subpixels and the second subpixels included in the plurality of pixels;
a plurality of gate bus lines each associated with any of a plurality of pixel rows included in the plurality of pixels;
a plurality of first source bus lines and a plurality of second source bus lines each associated with any of a plurality of pixel columns included in the plurality of pixels; and
a plurality of storage capacitor bus lines each connected with any of storage capacitors of the first subpixels and the second subpixels included in the plurality of pixels,
wherein the plurality of pixels are arranged such that the first subpixel of one pixel and the second subpixel of a pixel which adjoins the one pixel in the column direction adjoin each other,
the plurality of storage capacitor bus lines include a storage capacitor bus line connected with a storage capacitor of the first subpixel of the one pixel and with a storage capacitor of the second subpixel of the pixel which adjoins the one pixel in the column direction,
in any given frame period, the plurality of pixels include a plurality of pixel row pairs each associated with two selected pixel rows among the plurality of pixel rows, the plurality of pixel row pairs being each simultaneously selected,
in each pixel column, one pixel of each of the plurality of pixel row pairs is connected with the first source bus line associated with the pixel column, and the other pixel is connected with the second source bus line associated with the pixel column, and
when the liquid crystal display panel operates over a plurality of frame periods, the plurality of frame periods include a first type frame period and a second type frame period differing in terms of combinations of two pixel rows to be associated with each of the plurality of pixel row pairs,
a period with which the first type frame period and the second type frame period are switched and a period with which a polarity of a display signal voltage supplied to each of the plurality of first source bus lines and to each of the plurality of second source bus lines is inverted are different from each other.

8. The liquid crystal display panel of claim 1, wherein
a period with which the first type frame period and the second type frame period are switched and a period with which a polarity of a display signal voltage supplied to each of the plurality of first source bus lines and to each of the plurality of second source bus lines is inverted are equal to each other, and the first type frame period and the second type frame period are switched in response to a predetermined operation by a user.

9. The liquid crystal display panel of claim 1, wherein
a period with which the first type frame period and the second type frame period are switched and a period with which a polarity of a display signal voltage supplied to each of the plurality of first source bus lines and to each of the plurality of second source bus lines is inverted are equal to each other, and
the polarity of the display signal voltage supplied to each of the plurality of first source bus lines and to each of the plurality of second source bus lines is inverted in response to a predetermined operation by a user.

10. The liquid crystal display panel of claim 1, wherein
each of the first subpixel and the second subpixel includes
a liquid crystal capacitor formed by a counter electrode, a liquid crystal layer, and a subpixel electrode which opposes the counter electrode via the liquid crystal layer, and
a storage capacitor formed by a storage capacitor electrode electrically connected to the subpixel electrode, an insulating layer, and a storage capacitor counter electrode which opposes the storage capacitor electrode via the insulating layer,
the counter electrode is a single electrode which is common for the first subpixel and the second subpixel, while the storage capacitor counter electrodes of the first subpixel and the second subpixel are electrically independent of each other,
the TFT connected with each of the first subpixel and the second subpixel of each pixel is controlled to be ON/OFF in accordance with a scan signal voltage supplied to a common gate bus line; when the TFT is ON, a display signal voltage is supplied from a common source bus line to the subpixel electrode and the storage capacitor electrode included in each of the first subpixel and the second subpixel; after the TFT has been turned OFF, the voltage of the storage capacitor counter electrode of each of the first subpixel and the second subpixel varies; and the first and second subpixels have mutually different variations, which are defined by their directions and amplitudes, thus exhibiting different luminances at least one grayscale level.

11. A method for driving a liquid crystal display panel, the liquid crystal display panel including a plurality of pixels arranged in a matrix including a plurality of rows and a plurality of columns, each of the plurality of pixels including a first subpixel and a second subpixel arranged so as to adjoin each other in a column direction,
in any given frame period, the plurality of pixels including a plurality of pixel row pairs each associated with two selected pixel rows among the plurality of pixel rows,
in each pixel column, one pixel of each of the plurality of pixel row pairs being connected with a first source bus line associated with the pixel column, and the other pixel being connected with a second source bus line associated with the pixel column,
the plurality of pixel row pairs being each simultaneously selected,
the method comprising:
switching a first type frame period and a second type frame period differing in terms of combinations of two pixel rows to be associated with each of the plurality of pixel row pairs, inverting a polarity of a display signal voltage supplied to each of the first source bus line and the second source bus line, wherein a period with which the first type frame period and the second type frame period are switched and a period with which a polarity of a display signal voltage supplied to each of the first source bus line and the second source bus line is inverted are equal to each other, and a timing at which the first type frame period and the second type frame period are switched and a timing at which a polarity of a display signal voltage supplied to each of the first source bus line and the second source bus line is inverted are different from each other.

12. The method of claim 11, comprising switching the first type frame period and the second type frame period at a predetermined interval not less than one frame period.

\* \* \* \* \*